United States Patent [19]
Benson

[11] 3,928,974
[45] Dec. 30, 1975

[54] THERMAL OSCILLATOR
[75] Inventor: Glendon M. Benson, Danville, Calif.
[73] Assignee: New Process Industries, Inc., Minneapolis, Minn.
[22] Filed: Aug. 9, 1974
[21] Appl. No.: 496,229

[52] U.S. Cl. .................................. 60/650; 60/517
[51] Int. Cl.² ............................................ F02G 1/04
[58] Field of Search ............ 60/645, 650, 651, 671, 60/516, 517, 682

[56] References Cited
UNITED STATES PATENTS

| | | |
|---|---|---|
| 2,407,166 | 9/1946 | Kreitner et al................... 60/650 X |
| 3,256,691 | 6/1966 | Dobossy.............................. 60/650 |
| 3,324,652 | 6/1967 | Mailet................................ 60/650 X |

Primary Examiner—Allen M. Ostrager
Attorney, Agent, or Firm—Townsend and Townsend

[57] ABSTRACT

A thermomechanical oscillator for generating electricity, pressurizing fluid or pumping heat is disclosed. The device includes a heat source and sink, positive displacement oscillating elements that subject a working fluid to a thermodynamic cycle in which work and heat are exchanged, and a load that extracts enthalpic energy from the working fluid by positive displacement oscillating elements. A thermodynamic cycle produced by such oscillator is also disclosed.

13 Claims, 28 Drawing Figures

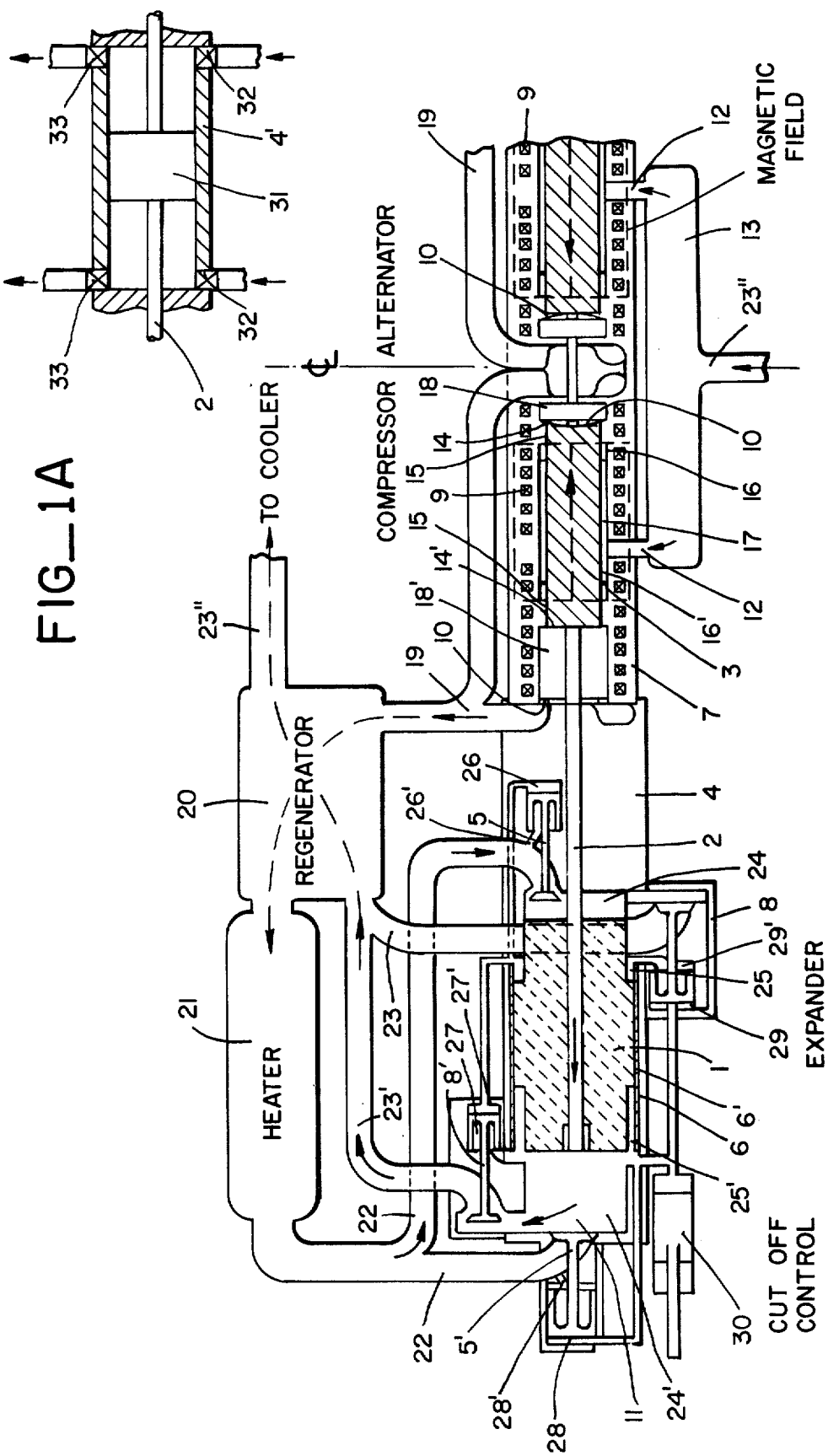

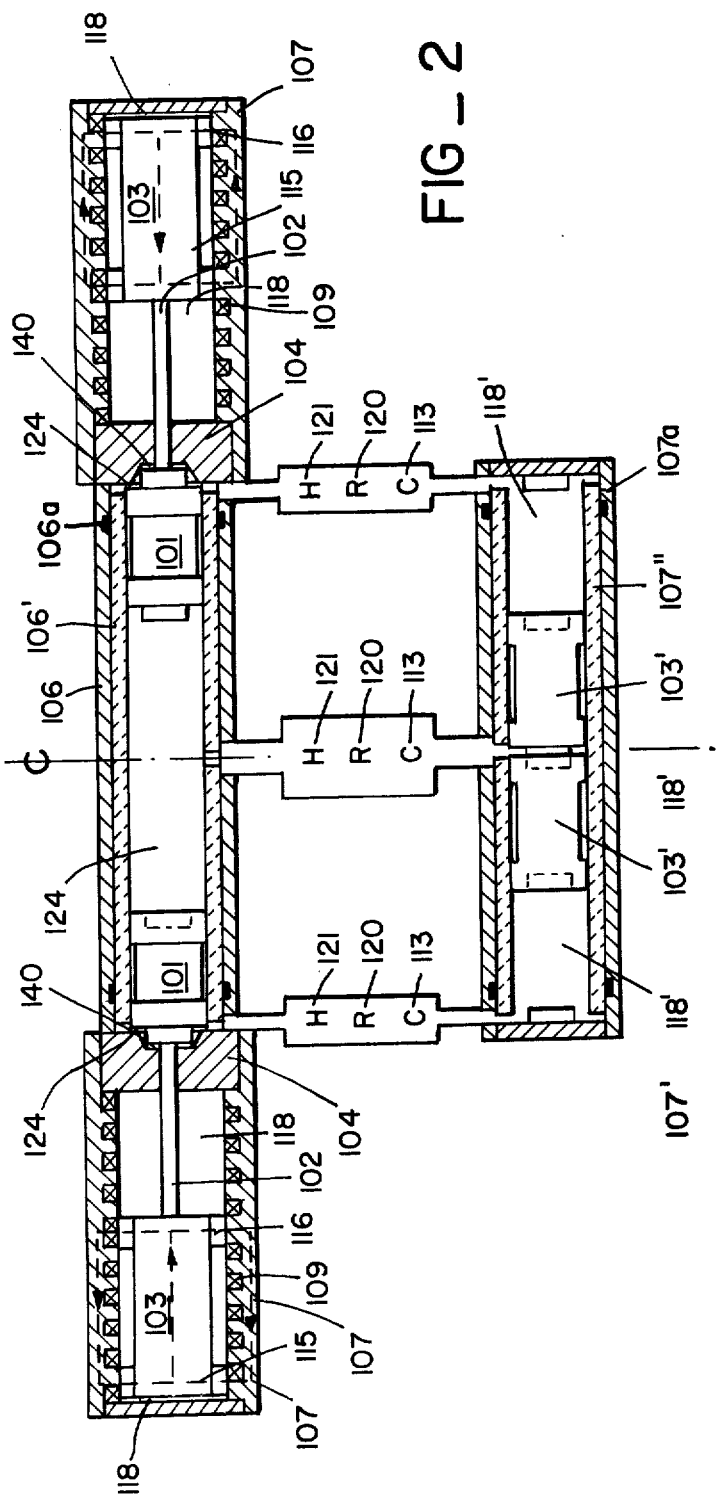

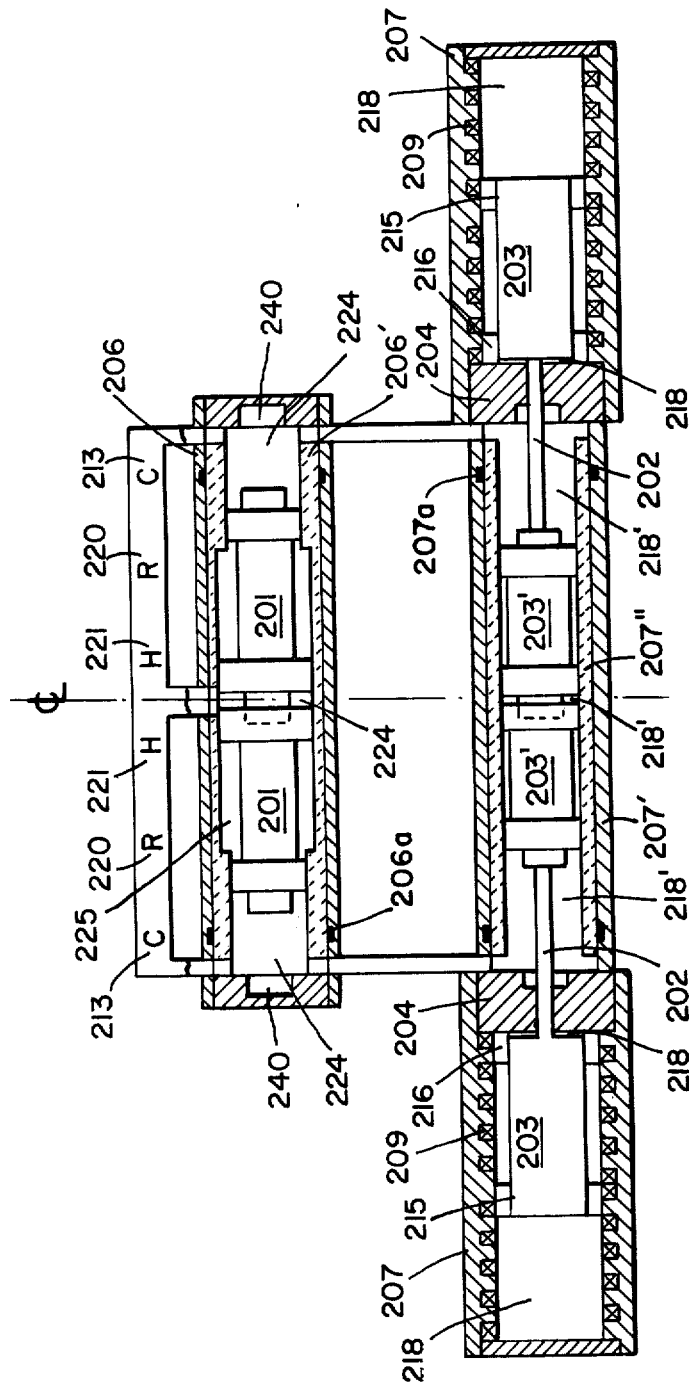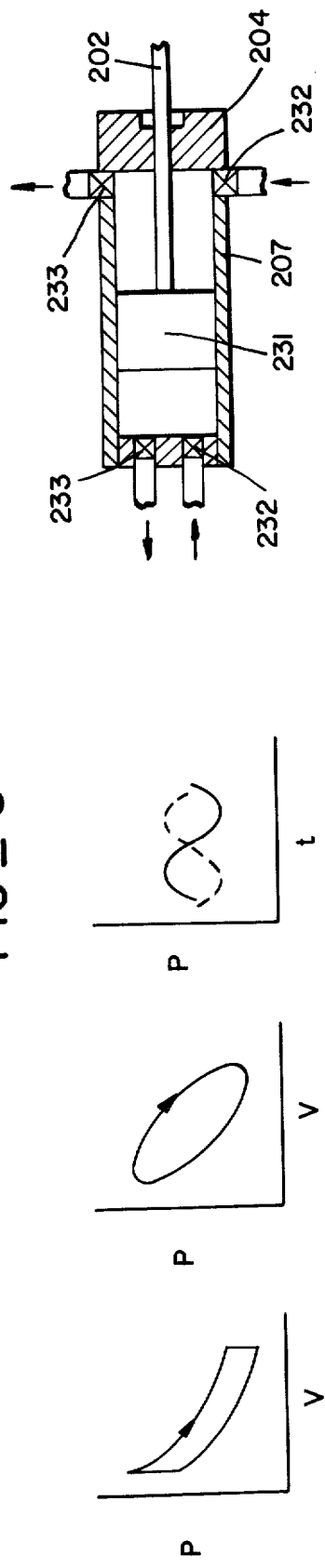

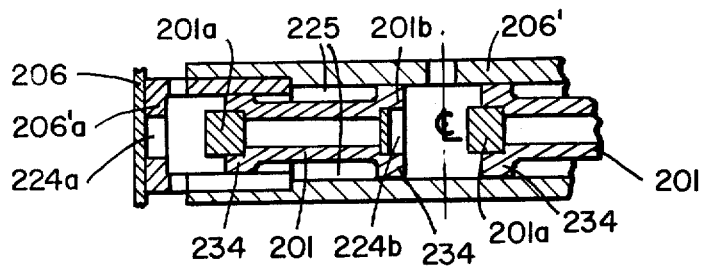
FIG _ 3D
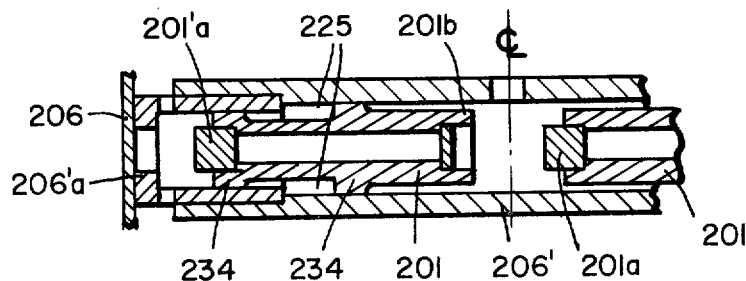
FIG _ 3E
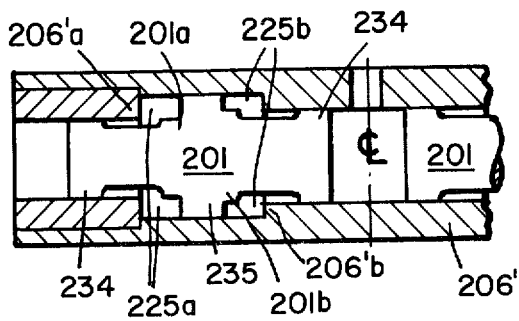
FIG _ 3F
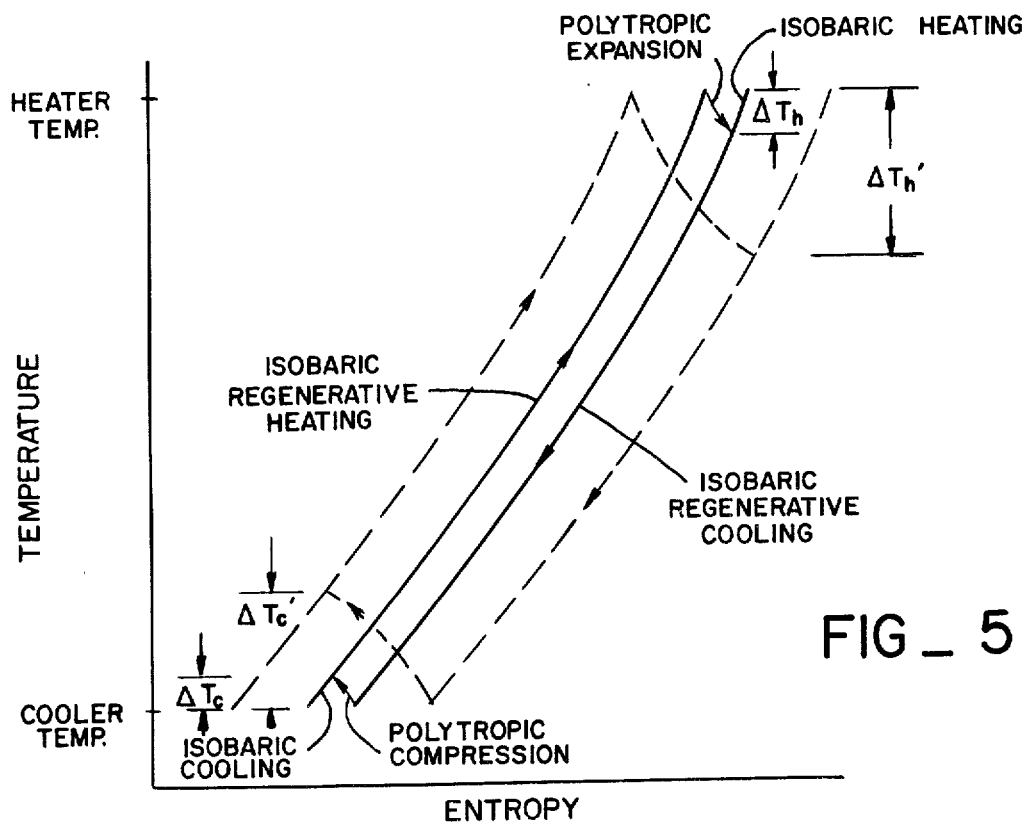
FIG _ 5

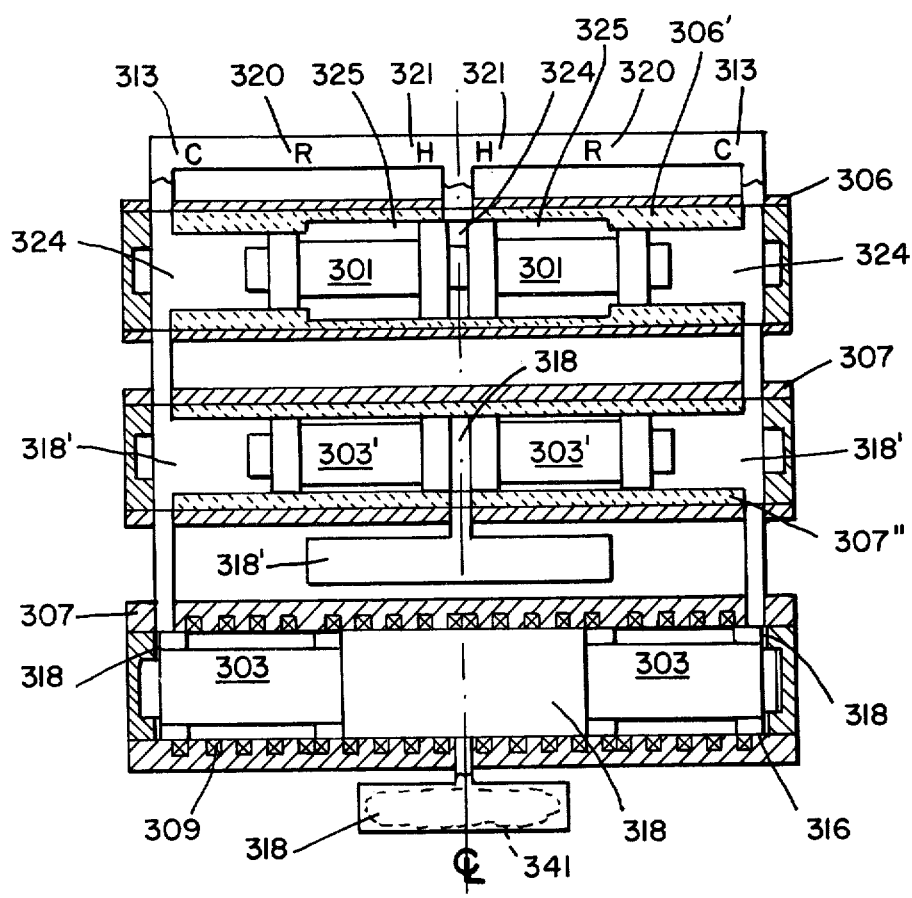
FIG_4
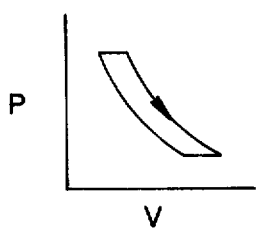
FIG_4A
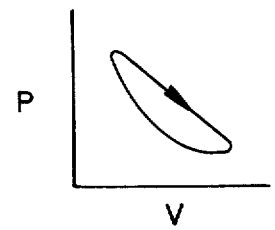
FIG_4B
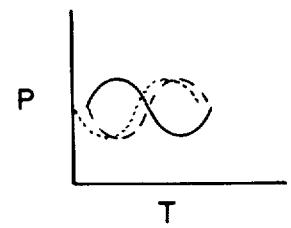
FIG_4C
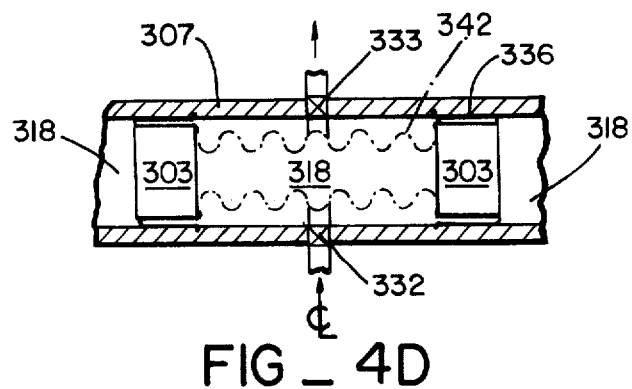
FIG_4D

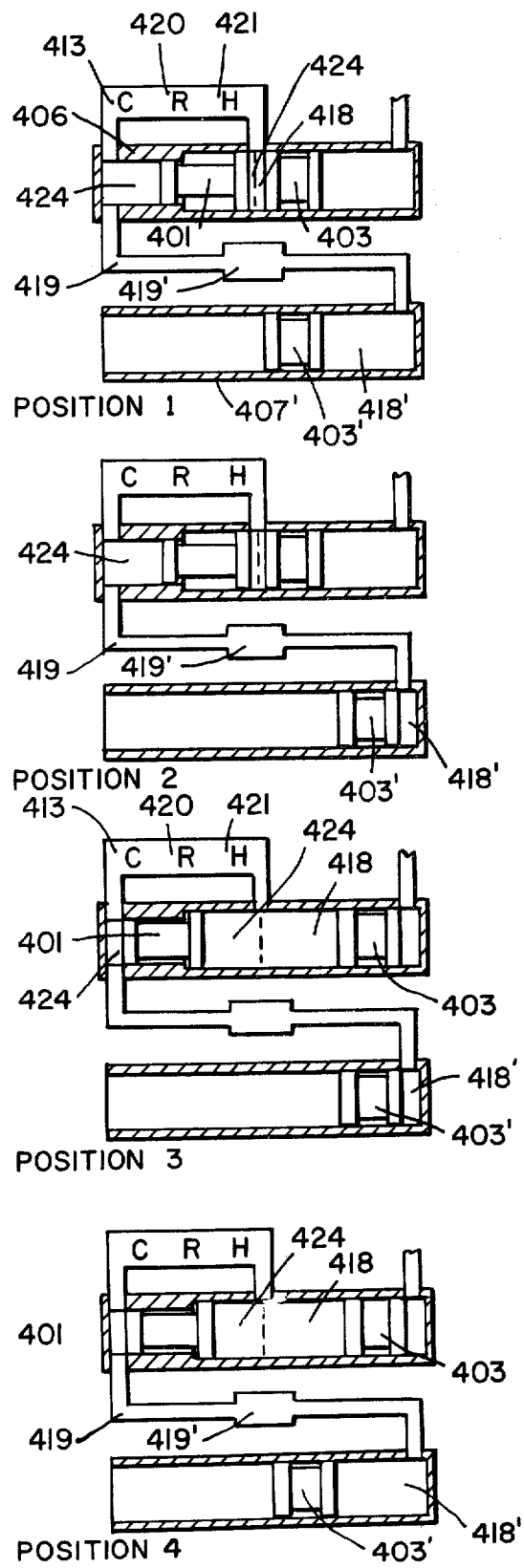
FIG _ 6A
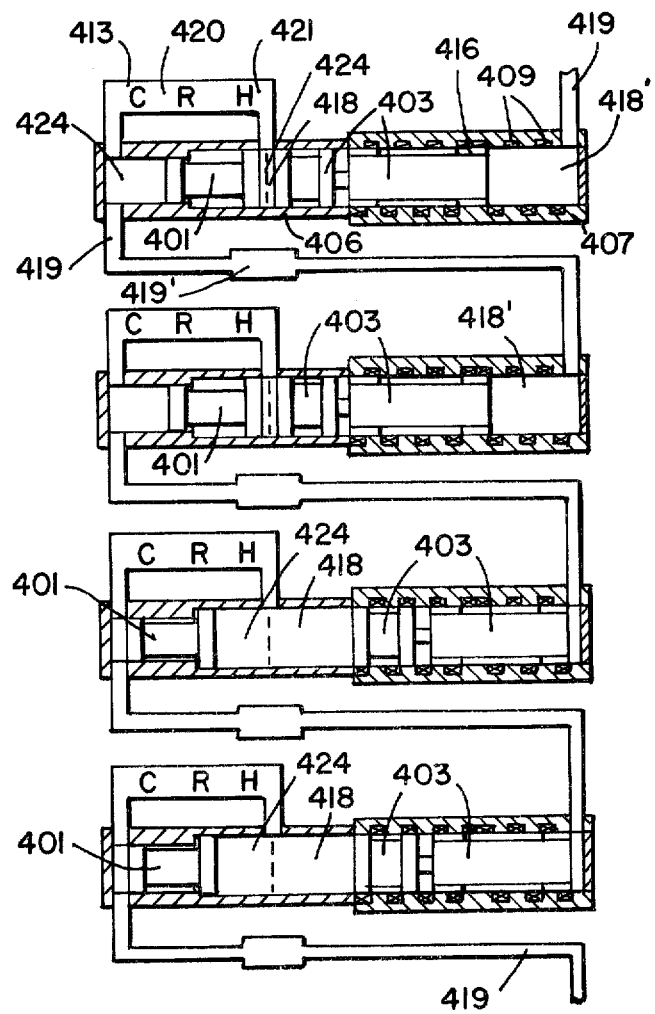
FIG _ 6B
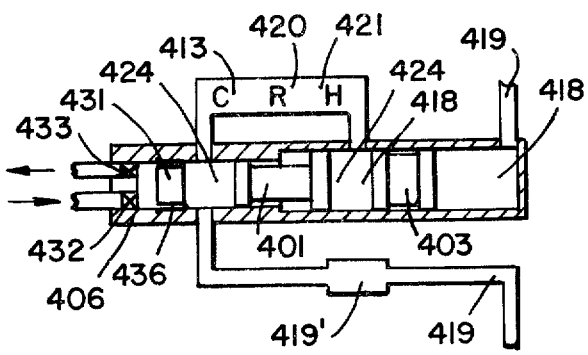
FIG _ 6C

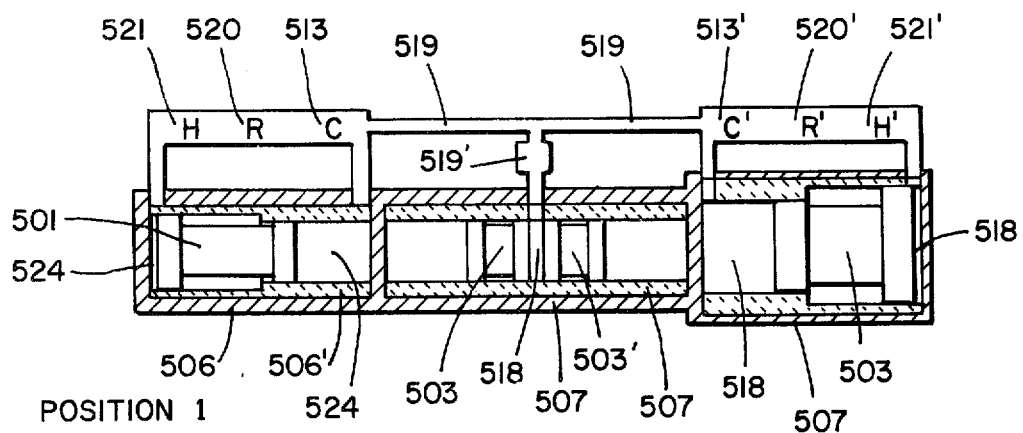
POSITION 1
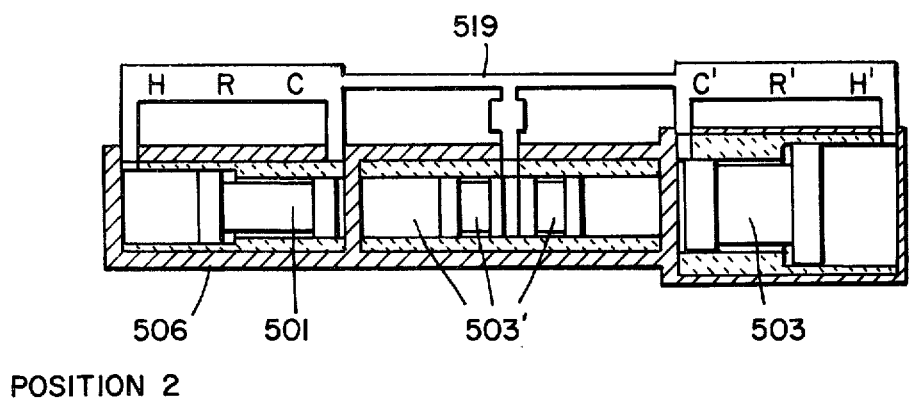
POSITION 2
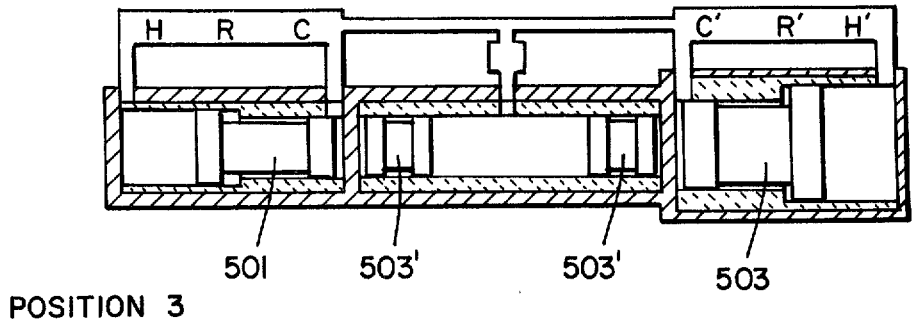
POSITION 3
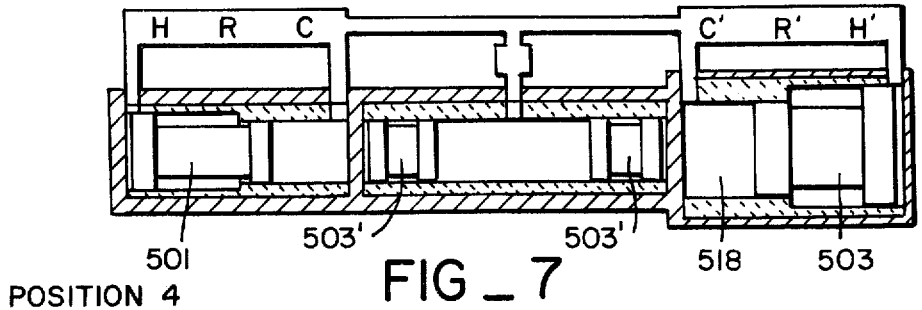
POSITION 4
FIG _ 7

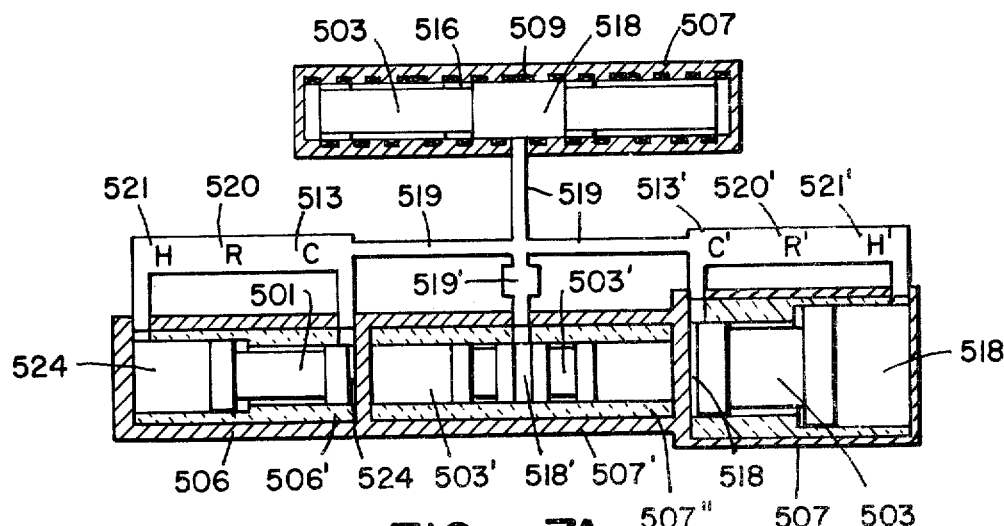
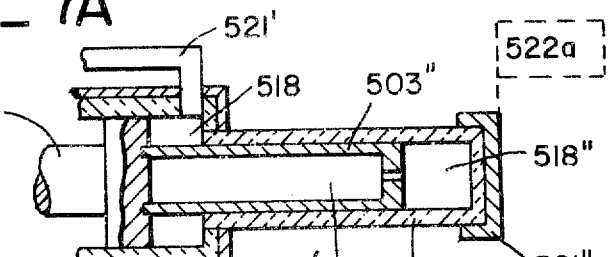
FIG_7A
FIG_7B
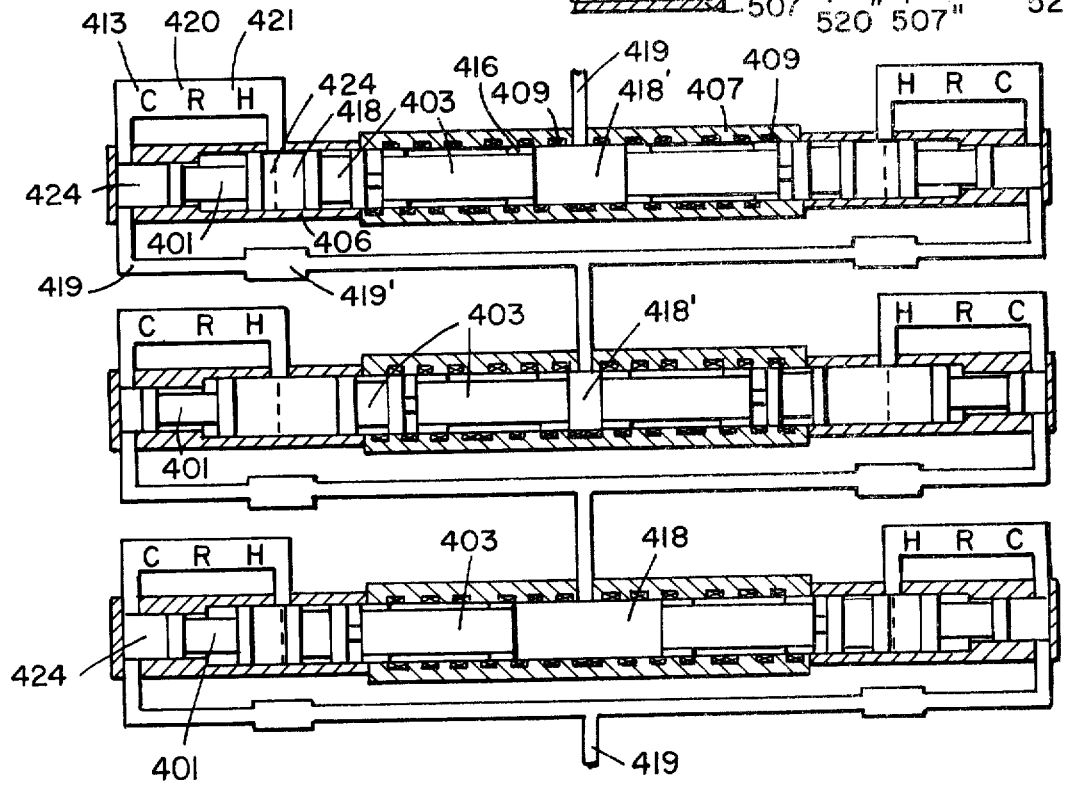
FIG_6D

THERMAL OSCILLATOR

BACKGROUND OF THE INVENTION

This invention relates to thermal machines which convert thermal energy to either fluid energy or electrical energy, or pump heat by applying either fluid energy or electrical energy, without the intermediary conversion to shaft power, by employing oscillating positive displacement elements that subject a working fluid to a thermodynamic cycle.

In energy conversion, it is often necessary to convert heat energy to a more useful form, such as fluid energy or electrical energy, or to use fluid energy or electrical energy to pump heat to achieve a desired temperature. It is further desirable to convert energy at as high an efficiency as possible, limited only by the First and Second Laws of Thermodynamics. It is further desirable that this be done by machines that are simple, compact, quiet, reliable, and vibration-free and that are self-starting and self-regulating to load variations. The present invention meets these requirements and can be varied in configuration and function to match a wide range of output and performance requirements.

Broadly stated, the present invention relates to machines in which freely oscillating positive displacement mechanical elements periodically subject a working fluid to a thermodynamic cycle through continuous thermal energy interchange with the surroundings and thereby produce a net heating or cooling effect, a net work output or a combination of both without intermediary conversion to shaft work. The continuous thermal energy interchange (as opposed to the intermittent thermal energy interchange produced in spark or compression ignited combustion engines), caused by a temperature difference between a thermal source and sink, provides the driving potential through volume and pressure change (related by the equation of state of the working fluid), to produce the driving force for the self-excitation of the positive displacement elements. The self-exciting driving force is periodic and can be made as nearly sinusoidal as desired. The thermal oscillator's analog is an electrical oscillator (active parametric power oscillator) and as a result may be classed as an active parametric power oscillator that achieves conversion of thermal energy to mechanical energy by using a thermal potential (temperature difference) to parametrically pump, through periodic changes in the working fluid's pressure and volume, a mechanical oscillator to produce a periodic mechanical output. As a result, whenever a temperature difference is impressed on the thermal oscillator, thermal energy parametrically pumps a mechanical oscillator to produce periodic mechanical output and conversely, whenever a periodic mechanical input is impressed on the thermal oscillator, mechanical energy parametrically pumps thermal energy against a temperature difference. Coupling a thermal oscillator engine to a thermal oscillator heat pump (a thermodynamically reversed thermal engine) results in a thermally powered heat pump (refrigerator) with optional mechanical energy output. As a result of this electrical analog, a thermal oscillator may be defined as a mechanical parametric power oscillator having positive displacement elements (including linear-pistons, circular-vanes, epitrochoid rotors and combinations thereof) that is self-excited by an impressed temperature difference and converts thermal energy to mechanical energy, or by thermally reversing, pumps thermal energy by applied mechanical energy. Mechanical energy so utilized includes pressurized fluid or electrical power, which for shaft coupling (such as shaft output) requires a second machine (fluid pump/motor or electric generator/motor).

Thermal oscillators are classified as open or closed types. Open thermal oscillators are thermal oscillators that are periodically connected to an essentially constant temperature heat source and an essentially constant temperature heat sink by valving means that are driven and phased by the resonant oscillation of the positive displacement elements. Closed thermal oscillators are valveless thermal oscillators that periodically transfer the working fluid through heat exchangers in which the pressure at any time is approximately equal but periodically varies in phase with the working fluid's pressure throughout the oscillator.

SUMMARY OF THE INVENTION

The present invention provides a method of subjecting a working fluid to a thermodynamic cycle to obtain work output, or to pump heat. The method comprises the steps of regeneratively cooling, polytropically compressing, regeneratively heating, and polytropically expanding the working fluid. The polytropically compressing step includes in combination isobarically cooling and polytropically compressing the working fluid with a resonant oscillating positive displacement element while a temperature difference is imposed on the fluid so that the compression is nearly isothermal. Similarly, the polytropically expanding step includes in combination isobarically heating and polytropically expanding the working fluid with a resonant oscillating positive displacement element while a temperature difference is imposed on the fluid so that the expansion is nearly isothermal.

The present invention further provides a thermal machine which functions as a damped resonant positive displacement mechanical oscillator. The machine comprises the heat exchange stage which includes a thermal source and a thermal sink. A working fluid is adapted to flow through the heat exchange stage including the source and the sink. At least two resonant oscillating positive displacement elements are interposed in the working fluid and are adapted to subject the working fluid to a thermodynamic cycle. At least one of the positive displacement elements provides a heat energy exchange between the working fluid and the heat exchange means.

The present invention provides positive displacement elements which are self-driven by the periodic pressure variation of the working fluid to oscillate at a damped resonant frequency. The resonant frequency is determined by the masses of oscillating elements and the effective spring coefficient of the working fluid. The damping caused by fluid friction and impressed load varies the phase and displacement of the elements, and the stable oscillations can be made as sinusoidal as required or desired by appropriately tailoring the design and the operation of the apparatus.

None of the patents found in the prior art illustrate apparatus which includes positive displacement elements which are free to oscillate at a damped resonant frequency. The resonant oscillators of the present invention provide variable phasing, stroking and damping to match load as well as the stabilizing effect of additional oscillating elements. In contrast, the patent to Beale, U.S. Pat. No. 3,552,120, illustrates a truncated Philips machine, as shown in U.S. Pat. No. 2,982,088, where the pistons contact each other or specially provided stops so that they reciprocate randomly and asinusoidally, and are therefore not damped resonant oscillators. The patents to Johnson, U.S. Pat. No. 3,460,344 and No. 3,812,682, teach a modified sterling thermodynamic cycle in which the compression ratio between the elements is constrained by common connection to a crankshaft. The apparatus of Johnson does not achieve the modified Ericsson cycle as taught herein, and does not illustrate the use of a damped resonant oscillator as taught by the present invention.

The principal features of this invention include: (1) self-starting and self-regulating to load with efficiency optimized for any given load; (2) high efficiency which approaches Carnot efficiency as thermodynamic irreversibilites and load approach zero; (3) high power densities of 10 hp/in.$^3$ displacement and 1 hp/lb weight; (4) silent, vibration-free operation with potential of markedly reducing exhaust emissions when fossil fueled; (5) operates as a heat engine or when reversed as a heat pump with load capacity increasing with temperature difference; (6) functions as a total energy system which simultaneously supplies electrical power and heating or cooling effect for local consumption or for transport applications; (7) permits hermetic sealing of the machine owing to the use of a stable working fluid and self-acting gas bearings; (8) functions equally well using a nuclear, radionuclide, solar, geothermal or fossil fuel heat source; (9) provides silent, low-emission, high efficiency prime mover for vehicle and marine propulsion; (10) pressurizes fluids directly without the intermediary shaft coupling to a heat engine; (11) provides in small sizes a self-regulating prime mover for blood pumps in artificial heart applications; (12) permits the direct liquifaction of cryogenic fluids by either electrical or thermal energy; (13) functions as baseload, peaking-plant or standby plant for utility generation of electrical power when fueled by nuclear, fossil, solar or geothermal energy; (14) employs non-strategic ceramic materials for the high temperature portions of the machine and low cost composite materials for the ambient and cold portions of the machine; and (15) permits flexibility in design, configuration, and construction to meet the range of applications.

The performance potentials of the present invention, when operated as a thermal engine, include: efficiency, emissions and noise-level equalling hydrocarbon fuel cells, power densities equalling regenerative gas turbines, and operating reliability and availability equalling hermetically sealed electric motor driven vapor compression refrigerators.

The foregoing, together with other objects, features and advantages of the present invention will become more apparent after referring to the following specification and accompanying drawings in which:

BRIEF DESCRIPTION OF THE DRAWINGS

FIG. 1 is a schematic elevation view of an open thermal oscillator constructed according to the teachings of the present invention;

FIG. 1A illustrates a modification of the embodiment shown in FIG. 1;

FIG. 2 is a schematic elevation view of a closed thermal oscillator constructed in accordance with the teachings of the present invention;

FIG. 2A is a pressure-volume diagram of the embodiment of FIG. 2 for discrete operation;

FIG. 2B is a pressure-volume diagram of the embodiment of FIG. 2 for continuous operation;

FIG. 2C is a pressure-time diagram of the embodiment of FIG. 2.

FIG. 2D is a schematic elevation view illustrating the use of the embodiment of FIG. 2 as a fluid pump;

FIG. 3 is a schematic elevation view of a third embodiment of the present invention;

FIG. 3A is a pressure-volume diagram of the third embodiment for discrete operation;

FIG. 3B is a pressure-volume diagram of the third embodiment for continuous operation;

FIG. 3C is a pressure-time diagram for the third embodiment;

FIGS. 3D, E, and F are schematic elevation views of varying piston designs associated with the third embodiment;

FIG. 3G is a schematic elevation view of a piston pump associated with the third embodiment;

FIG. 4 is a schematic elevation view of a fourth embodiment of the present invention;

FIG. 4A is a pressure-volume diagram for discrete operation of the fourth embodiment;

FIG. 4B is a pressure-volume diagram for continuous operation of the fourth embodiment;

FIG. 4C is a pressure-time diagram for the fourth embodiment;

FIG. 4D is a schematic elevation view of a piston pump associated with the fourth embodiment;

FIG. 5 is a temperature-entropy diagram illustrating the operation of certain embodiments of the present invention;

FIGS. 6A–C are schematic views of a fifth embodiment of the present invention;

FIG. 6D is a schematic elevation view of a sixth embodiment of the present invention, which is a modification of the fifth embodiment;

FIG. 7 is a schematic view of a seventh embodiment of the present invention wherein a thermal engine drives a heat pump without intermediary mechanical coupling;

FIG. 7A is a schematic view illustrating an alternate form of the seventh embodiment.

FIG. 7B is a schematic elevation view of a cryogenic refrigerator associated with the seventh embodiment.

DESCRIPTION OF THE PREFERRED EMBODIMENTS

Referring more particularly to the drawings and specifically to FIG. 1, wherein the left hand of an open thermal oscillator is shown, reference numeral 1 indicates a ceramic piston fitted to ceramic floating sleeve 6' and connected by metal drive rod 2 to magnetic piston 3. The rod is supported by sealed bushing 4 that houses intake valve assembly 5 and connects sleeve retaining expander cylinder 6 with compressor cylinder 7. Cylinder 6 contains exhaust valve assemblies 8 and 8'. Cylinder 7 contains helically wrapped alternator coils 9 and accommodates discharge valve assemblies 10. Attached to cylinder 6 is cylinder head 11 that contains intake valve assembly 5'. Inlet ports 12 pierce cylinder 7 and flow communicates to cooler 13. Attached to piston 3 are intake valves 14 that valve flow-channels 15, formed by external end splines of piston 3 and outer annular permanent magnets 16, which in turn form annular chamber 17 with cylinder 7. Discharge valves 10 valve compression chambers 18, 18' to discharge pipe 19 that in turn couples to counterflow regenerator 20. Heater 21 connects regenerator 20 to intake pipes 22 that attach to intake valve assemblies 5. Exhaust pipes 23, 23' connect exhaust valve assemblies 8 to regenerator 20 which in turn is coupled to cooler 13 by intake pipe 23'', shown unjoined for simplicity. The right side of this configuration is not shown, since it has mirror symmetry about the indicated vertical centerline and its reciprocating elements operate in phase opposition to those elements on the left side.

The operation of this configuration of the present invention can be appreciated by following this machine through one cycle of operation. Consider the expander piston 1, drive rod 2 and compressor piston 3 moving leftward, as indicated by the arrow on rod 2. This movement draws working fluid through cooler 13, inlet port 12, rightward through annular chamber 17, right splined grooves 16 and through right open intake valve 14 to right chamber 18 which is thereby filled with fluid. Simultaneously fluid in left chamber 18, previously filled with fluid during the previous intake stroke, is compressed by virtue of the leftward motion of compressor piston 3, closed left intake valve 14 and opened left discharge valve 10, and flows through discharge pipe 19 to regenerator 20 where the compressed fluid is heated by counterflow heat exchange with exhausted fluid flowing through separate channels in the regenerator that prevent exhaust fluid from communicating with the incoming compressed fluid. Intake fluid so heated then flows into heater 21 where heat is exchanged with an external heat source at nearly constant pressure. The heated fluid flows from heater 21 through intake pipes 22 to right intake valve 5 and into right chamber 24 where the hot fluid expands by driving expander piston 1 leftward. Simultaneously expanded fluid in left chamber 24', previously expanded during the previous expansion stroke, are displaced from this chamber by virtue of the leftward motion of expander piston 1, the closed left intake valve 5' and the open left exhaust valve 8', and flow through left exhaust pipe 23' to regenerator 20 where the exhausted fluid is cooled by counterflow heat exchange with the compressed air flowing in separate channels, and then exhausted into intake pipe 23'' which connects to cooler 13 to complete the flow path.

As the expander piston 1 moves leftward, the pressure in right annular chamber 25 around piston 1 is reduced which reduces pressure in chamber 26 of right intake valve 5 to a value below that of the intake pressure in chamber 26' of right intake valve 5 and therefore closes right intake valve 5. The fluid in right chamber 24 of the expander cylinder then expands nearly adiabatically as piston 1 continues moving leftward. This leftward motion then captures fluid in left chamber 25', which is then compressed. This pressure is communicated to chamber 27 of left exhaust valve 8', which pressure is then higher than the pressure in chamber 27' of the same valve, and thereby closes said exhaust valve. Simultaneously the pressure in left chamber 25' is communicated to chamber 28 of left intake valve 5', which pressure is then higher than the pressure in chamber 28' of the same valve, and thereby open said valve. Hot pressurized fluid then flows into the left chamber 24' of the expander cylinder and drives the expander piston to the right. The pressurized fluid in left annular chamber 25' also is communicated to chamber 29 of right exhaust valve 8 whereas chamber 29' of the same valve is at low exhaust pressure and thereby the pressure difference so produced opens said valve to allow exhausting right chamber 24 through right exhaust pipe 23 to regenerator 20 and then into intake pipe 23' to return to cooler 13.

The rightward stroke of the expander piston 1 drives the compressor piston 3 rightward reducing the pressure in left compression chamber 18', which closes left discharge valve 10. Simultaneously, the pressure in right compression chamber 18 increases, closing right inlet valve 14. As the pressure in left expansion chamber 25' is reduced so is the pressure in chamber 28 of the left intake valve, whereas the pressure in chamber 28' of said valve remains constant and this pressure difference so produced then closes left intake valve 5'. Continues rightward travel of piston 1 then expands the fluid in left chamber 24' and exhausts the fluid in right expansion chamber 24. Simultaneously the fluid in right compression chamber 17 is compressed to discharge pressure and the fluid in the left compression chamber 18' is expanded to inlet fluid pressure. Further rightward travel of compressor piston 3 then overpressurizes the fluid in right compression chamber 18, which opens right discharge valve 10 and compressed fluid then is delivered into discharge tube 19. The fluid in left compression chamber 18' is simultaneously underpressurized by the rightward stroke of compressor piston 3, which opens left inlet valve 14' and allows fluid to flow through inlet port 12, annular chamber 17, left splined piston section 16', and left inlet valve 14' into left chamber 18. As the expander piston continues rightward, the pressure in the right annular chamber 25 increases such that at extreme right stroke the pressure in right exhaust valve chamber 29' is higher than in chamber 29 which closes said exhaust valve. Simultaneously the pressure in right annular chamber 25 is communicated to right intake valve chamber 26 which pressure is higher than in chamber 26' of said valve and thereby opens said valve, filling left expansion chamber 24' with hot pressurized fluid that then drives the expander piston leftward. This completes one cycle of this double acting opposed piston machine.

Net work produced by this configuration of the present invention is absorbed by compressor piston 3 in overcoming the electromagnetic drag produced by annular radially poled permanent magnets 16 which by reciprocating motion shear the magnetic flux lines traversing the conductor wires in helically wound coils 9, with such magnet flux path indicated by a broken closed curve in FIG. 1.

This configuration operates at a damped resonant frequency determined primarily by the mass of the reciprocating components and the effective spring constant of the working fluid in right and left chambers 18 and 24. Overstroking is prevented by annular chambers 25 acting as bounce chambers at stroke end. Power delivered by expander piston 1 is absorbed by compressor piston 3 by compression work and electrical power generated through induced electromagnetic drag. Control of power delivered by the expander piston is by cutoff control 30 which regulates the closing of the intake valves of the expander piston by adjusting the effecting dead volume of the fluid that is pressurized by chamber 25 of the expander piston. The cut-off control when driven by a referenced pressure maintains constant stroke and matches expander piston work output to compressor piston work absorbed.

Expander piston 1, drive rod 2 and compressor piston 3 are working fluid lubricated by self-acting gas bearings and operate hydrostatically at stroke ends by fluid blow down and hydrodynamically at mid-stroke by fluid film shear rate. All components of the expander are made from a high temperature, high strength ceramic, such as silicon nitride or silicon carbide with the piston match-ground to a resiliently mounted floating cylinder sleeve 6' and the valve actuator pistons are match-ground to their sleeve bushings. The linear alternator is of conventional construction that is used in linear generators whereas the heater, regenerator, cooler and connecting ducts are of construction conventional to similar components of closed-cycle gas turbines.

Heat addition of the working fluid is by heat exchange with an external heat source, exemplified by chemical reactions (such as in conventional boilers) or by nuclear reactions (such as in nuclear reactors). The cooler is externally cooled by a heat sink that absorbs heat from the working fluid. The working fluid, which is separated from the heat source and sink may be chosen to optimize the macine's performance. In addition, the closed-cycle operation permits the hermetic sealing of the working fluid in the machine.

By using different working fluids different thermodynamic cycles are obtained. Gases (such as hydrogen, helium, argon or combinations thereof) produce a regenerative Brayton cycle; condensible vapors (such as water, organic fluids, or potassium) produce a Rankine cycle; supercritical fluids (such as carbon dioxide or ammonia) produce a Feher cycle, with all cycles having variable exhaust cut-off.

The configuration shown in FIG. 1 may be modified as shown in FIG. 1A by extending rod 2 through sealed compressor bushing 4' to a fluid pump in which double-acting piston 31 reciprocally pumps fluid through inlet check valves 32 and outlet check valves 33, where the pumping fluid is either gaseous or liquid. This configuration produces both pressurized fluid and electrical power.

The operation of the configuration shown in FIG. 1 may be thermally reversed by interchanging the exhaust and intake valves of the expander, interchanging the inlet and outlet ducts of the compressor and by applying an AC voltage to coils 9 which now cause the linear alternator to motor and thereby provide mechanical work to pistons 1 and 3. Operation in this mode reverses the flow of the working fluid such that flow now occurs from compressor through cooler 13, regenerator 20, expander, heater 21, regenerator 20 to compressor. Furthermore, in this operating mode the expansion process in the expander cools the fluid exhausted therefrom and causes heat to be absorbed in the heater which produces a cooling effect in the heater and the compression process in the compressor heats the fluid exhausted therefrom and causes heat to be rejected in the cooler. If heat is then transported from the cooler, a continuous cooling effect is produced at the heater and therefore this operating mode functions as an electrically powered heat pump which pumps heat from the heater to the cooler which is at a higher temperature than the heater.

Another embodiment of this invention is specified in FIG. 2 as a closed thermal oscillator and such embodiment includes ceramic pistons 101 match-fit to ceramic floating sleeve 106' and each connected by metal drive rod 102 to magnetic piston 103. The rod is supported by sealed bushing 104 which connects sleeve retaining hot cylinder 106 to cylinder 107 which together with piston 103 operate at substantially the temperature of cooler 113 owing to cylinder 107 being cooled by the same coolant as used in cooler 113. Cylinder 107 contains coils 109 which are magnetically coupled by radially poled annular permanent magnets 116 that create the magnetic flux path as shown by the dashed lines in piston 103 and cylinder 107. Permanent magnets 116 circumferentially surround the piston end splines 115 that provide flow communication and pressure equalization between left and right chambers 118. In this embodiment the alternator and compressor cylinders are separated, with primed numbers referencing the compressor cylinder in this embodiment. Metal piston 103' is match-fit to metal floating sleeve 107" which is retained by cylinder 107'. Connected to each chamber 118' of cylinder 107' is a cooler 113, a regenerator 120 and a heater 121 with each heater connected to each chamber 124 of cylinder 106.

This embodiment, as well as all other embodiments of this invention, features pressure-balanced, floating ceramic sleeves (cylinder liners) 106' with match-ground ceramic pistons 101 of the same ceramic and pressure-balanced floating metal sleeves 107" with match-ground metal pistons 104' of the same metal. This design feature provides for distortion-free operation since the sleeves float in the cylinder bore on resilient mountings 1062 and 107'2 and the external and internal pressures action on the sleeve are equalized while the use of the same low expansion coefficient materials for sleeve and piston in each cylinder assure balanced thermal expansion. The use of ceramic sleeves and pistons in the high temperature cylinder 106 provide the long-term dimensional stability under thermal cycling conditions that is necessary for the satisfactory operation of the gas bearings that support and lubricate pistons 101, 103, and 103°. The gas bearings function by generating a gas film that uses the working fluid as the gas film lubricant, which film is provided by hydrodynamic action throughout the mid stroke range of the pistons, owing to the high shear velocity between piston and bore, and is provided by hydrostatic action at the end stroke range of the pistons, owing to the pressure difference of the working fluid in the chambers adjacent to the piston end-faces that occurs near stroke end.

The operation of this embodiment of the present invention can be appreciated by considering one cycle of operation, first for discrete reciprocation of pistons 101, 103, and 103' and then for the continuous nearly sinusoidal reciprocation which occurs in practice. Considering only the half of the machine to the left of the vertical line of symmetry (since the right half operates in mirror-image fashion to the left half) and beginning the cycle when piston 101 is at left stroke limit and piston 103' at right stroke limit, as shown in FIG. 2, then piston 103' moves leftward compressing the cool working fluid in the left chamber 118' while expanding cool fluid in center chamber 118'. At mid-stroke position of piston 103', piston 101 moves rightward while piston 103' continues moving leftward so as to maintain the fluid in left chambers 118' and 124 at constant volume while fluid is transferred from cool chamber 118' through the left cooler 113, left regenerator 120 and left heater 121 to hot chamber 124, thereby heating the fluid at constant volume. Likewise, fluid in hot center chamber 124 is transferred through center heater 121, center regenerator 120 and center cooler 113 to cool center chamber 118' thereby cooling the fluid at constant volume. Piston 103' is now at far left and piston 101 at mid-stroke. Piston 101 continues moving rightward adiabatically expanding the fluid in left chamber 124 while compressing and transferring the fluid from center chamber 124 through the center heater 121, center regenerator 120 and center cooler 113 to center chamber 118'. Piston 101 is now at its right stroke limit and piston 103' at its left stroke limit. Piston 103' now moves rightward expanding and transferring the fluid in left chamber 124 through left heater 121, left regenerator 120 and left cooler 113 to left chamber 118' while adiabatically compressing fluid in center chamber 118'. At mid-stroke position of pistin 103' piston 101 moves leftward as piston 103' continues to move rightward thereby transferring fluid from left chamber 124 through the left heater, regenerator and cooler to left chamber 118' which produces a constant volume cooling process. Similarly, fluid in center chamber 118' is transferred through the center cooler, regenerator and heater to center chamber 124 which produces a constant volume heating process. Piston 103' is now at right stroke limit and piston 101 is at mid stroke. Piston 101 continues to move leftward adiabatically expanding the fluid in center chamber 124 and compressing and transferring fluid from left chamber 124 through the left heater, regenerator and cooler to left chamber 118'. Piston 101 is now at left stroke limit and piston 103' at right stroke limit, which completes the cycle. During this cycle the working fluid to the left of left pistons 101 and 103' has been discretely subjected to an adiabatic compression, a constant volume heat addition, an adiabatic expansion and a constant volume cooling whereas the fluid to the right of left pistons 101 and 103' and contained in the center chambers has been subjected to the same cyclic process but phased 180° from the left fluid. As a result, the fluid in both the left and center chambers has been subjected to the same thermodynamic cycle (the classic Otto cycle) which when displayed on pressure-volume coordinates appears as shown in FIG. 2A. The area enclosed by the curve traced in FIG. 2A represents the net work produced by the fluid in this cycle.

Considering next the operation of this embodiment for continuous nearly sinusoidal stroking of pistons 101, 103, and 103', the cyclic processes are no longer distinct but become diffuse as displayed on pressure-volume coordinates shown in FIG. 2B for this cycle. The area enclosed by the curve traced in FIG. 2B represents the net work produced by the fluid in this cycle. The net work is delivered to piston 101 and is transmitted by drive rod 102 to alternator piston 103 wherein it overcomes the induced electromagnetic drag experienced by piston 103. The driving force on pistons 101 and 103' is produced by the respective pressure differences that exist between end chambers 124 and center chamber 124 and between end chambers 118' and center chamber 118, with such pressure difference acting on the piston's cross-sectional are to produce the net driving force. The pressure in end chambers 118' and 124 varies nearly sinusoidally with time but is nearly constant in each chamber at any given time, as shown by the solid curve in FIG. 2C. The pressure in center chambers 118' and 124 varies identically but is 180° out of phase with the end chambers as shown by the dashed curve in FIG. 2C. The driving force so produced is balanced by the inertial and damping forces exhibited by the pistons, which for piston 103' is essentially the inertial force whereas for piston 101 it is both the inertial force and the load dependent damping force. As a result, piston 103' is at end stroke at maximum pressure difference between outer and inner chambers 118' whereas the position of piston 101 at maximum pressure differences depends on load and gas spring effect. If the inertial force of piston 101, rod 102, and piston 103 is balanced by a gas spring, such as obtained by blocking splines 115 to permit left and right chambers 118 to act as gas springs, then the position of piston 101 is at mid-stroke at maximum pressure difference and therefore piston 103' leads piston 101 by 90° independent of alternator load. If the inertial force of pistons 103 and 101 and drive rod 102 are not balanced by a spring force then both phase angle and stroke change with alternator load.

For stable periodic oscillation of the reciprocating elements, the mass of working fluid contained in the left and far right chambers 118' and 124 and in the outer heat exchangers must equal the mass of working fluid contained in the center chambers 118' and 124 and in the center heat exchangers.

This embodiment reciprocally oscillates at a damped resonant frequency determined primarily by the mass of the reciprocating components and the effective spring constant of the working fluid. Overstroking is prevented by bounce chambers 140 at stroke-ends, as shown in FIG. 2, which capture and then compress this captured working fluid to arrest the piston, and then accelerate the piston in the reverse direction by expanding the captured working fluid. Damping is provided in the bounce chamber by using a progressive bleed orifice such as is obtained by using a tapered female chamber and a straight male plunger, as shown in FIG. 2, to provide a variable area orifice as the plunger engages the chamber. As a result, the bounce chambers prevent overstroking by acting as cushioned stroke limiters with variable damping rate using the working fluid as the cushioning medium.

Output is self-controlled by the self-phasing of piston 103' to 101 and by the variable stroke of pistons 101 and 103' with phase angle moving toward 180° (if inertial force is unbalanced by spring force) and stroke decreasing as the load is decreased.

The operation of this configuration can be thermally reversed by applying an AC voltage to the linear alternator coils 109 which then causes linear motor action that in turn drives pistons 101 causing periodic fluid expansion in chambers 124 and periodic fluid compression in chambers 118'. The periodic fluid expansion in chambers 124 causes heat to be absorbed from heaters 121 thereby cooling the heaters whereas the periodic fluid compression in chambers 118' causes heat to be rejected from the coolers 113 thereby heating the coolers. If external heat rejection is provided at coolers 113, then an external cooling effect is produced at heaters 121 as the pistons continue to reciprocate by being driven by electric power supplied to coils 109. As a result, heat is pumped from the lower temperature heaters 121 to the higher temperature coolers 113 and therefore this embodiment functions as an electrically driven heat pump.

An alternate load for the alternator load embodiment shown in FIG. 2 is a fluid pump which replaces the linear alternator contained in cylinder 107. One such fluid pump is shown in FIG. 2D as a double acting piston pump that is cooled by coolant used in coolers 113 and is driven by drive rod 102, connected to piston 131, which reciprocally pumps fluid through inlet check valves 132 and outlet check valves 133 with sealing from chamber 124 provided by sealed bushing 104 and where the pumped fluid is either gaseous of liquid.

Another embodiment of the present invention is shown in FIG. 3, and such embodiment includes magnetic pistons 203 that are each driven by metal drive rod 202 connected to metal piston 203' that is match-fit to metal sleeve 207" contained by cylinder 207', and heat exchangers 213, 220, and 221 that circumscribe cylinder 206 which contains differential area ceramic pistons 201 that are match fit to ceramic sleeve 206', with the other components similar to those shown in FIG. 2.

The operation of this embodiment will be described by considering one cycle of operation, first for discrete reciprocation of pistons 201, 203, and 203' and then for the continuous nearly sinusoidal reciprocation which occurs in practice. Again considering only the half of the machine to the left of the verticle line of symmetry (since the right half operates in mirror-image fashion to the left half, and beginning the cycle when pistons 201 and 203' are at their right stroke limits, as shown in FIG. 3, then piston 203' full strokes leftward adiabatically compressing the cool working fluid in left chambers 218' and 224 and adiabatically expanding the fluid in center chamber 218'. Piston 201 then full strokes leftward transferring at constant volume the fluid from left chamber 224 through cooler 213, regenerator 220 and heater 221 to center chamber 224 which process corresponds to a constant volume heat addition process. Piston 203' then full strokes rightward adiabatically expanding the fluid in center chamber 224 and left chamber 218' while adiabatically compressing the fluid in center chamber 218'. Piston 201 then full strokes rightward transferring at constant volume the fluid from center chamber 224 through heater 221, regenerator 220 and cooler 213 to left chamber 224 which process corresponds to a constant volume cooling process. This completes the cycle during which the fluid in left chambers 218' and 224 and center chamber 224 has been discretely subjected to an adiabatic compression, a constant volume heat addition, an adiabatic expansion and a constant volume cooling which processes correspond to the classic Otto cycle and which when displayed on pressure-volume coordinates appear as shown in FIG. 3A. The area enclosed by the curve traced in FIG. 3A represents the net work produced by the fluid in this cycle.

Considering next the operation of this embodiment for continuous nearly sinusoidal stroking of pistons 201, 203, and 203', the cyclic processes are no longer distinct but become diffuse as is displayed on pressure-volume coordinates shown in FIG. 3B for this cycle. The area enclosed by the curve traced in FIG. 3B represents the net work produced by the fluid in this cycle. This net work is delivered to piston 203' and is transmitted by drive rod 202 to alternator piston 203 wherein it overcomes the induced electromagnetic drag experienced by piston 203. The driving force on piston 203' is equal to the product of the pressure difference between left and center chambers 218' times the cross-sectional area of piston 203', neglecting the cross-sectional area of drive rod 202. The pressure in left chambers 218' and 224 and in center chamber 224 varies nearly sinusoidally with time but is nearly constant (subject to a small variation between left and center chambers 224 due to heat exchanger pressure drop that is explained later) in each chamber at any given time, as shown by the solid curve in FIG. 3C. The pressure in center chamber 218', which contains the same fluid mass (termed ballast fluid mass) as that contained in outer chambers 218' and 224 and center chamber 224 together with that contained in the left and right heat exchanger sets, varies nearly identically but is out of phase with the pressure in outer chambers, as shown by the dashed curve in FIG. 2C. The difference between these two pressures, which is dependent on the phase angle between pistons 201 and 203' and which is nearly sinusoidal, is the pressure difference that acts on piston 203'.

The driving force on left piston 201 equals the product of the fluid pressure in left chamber 224 times the cross-sectional area of the left end of left piston 201 less the product of the pressure in center chamber 224 times the cross-sectional area of the right end of left piston 201, with the right cross-sectional area of left piston 201 being larger. The pressure difference between left and center chambers 224 is caused by fluid pressure drop experienced by fluid flowing through the left heat exchangers. This piston driving force is balanced by the piston damping force and piston inertial force. The piston damping force, which for left piston 201 equals the difference in pressure between left and center chambers 224 times the cross-sectional area of the left end of left piston 201 is greatest at mid-stroke since the pressure drop through the left heat exchangers is greatest at the highest fluid velocity through these heat exchangers which velocity occurs at the highest velocity of piston 201 which occurs at mid-stroke. The inertia piston force is proportional to the mass of piston 201 and to the square of the reciprocating cyclic frequency and is maximum at stroke ends. The relationship of these forces determines the phase angle of piston 201 to piston 203', which angle is dependent on alternator load and piston design for specified heat exchangers. For specified pistons 201, 203, and 203', the phase angle shifts and the piston stroke changes to match load requirements, the extent of which requires the exact solution of the dynamic equations of motion coupled with the thermodynamic cyclic equations, heat transfer equations and equations of state of the working fluid.

The effect of piston design may be appreciated by considering FIGS. 3D, 3E, and 3F. In FIG. 3D is shown a differential area piston 201 that is match-fit to sleeve 206' to form annular chamber 225. By changing the dead volume of chamber 225, the effective gas spring rate produced by this chamber is changed for a constant differential area. The dead volume may be changed, for example, by changing the inner diameter of the chamber, formed by piston 201 or by shifting the location of right land 234, such as shown in FIG. 3E. This gas spring force can be increased further by using the design shown in FIG. 3F in which center land 235 of piston 201 divides chamber 225 into two chambers 225a and 225b that subject the working fluid captured therein to alternating compression and expansion processes. The gas spring force so produced acts in force opposition to the inertial force of piston 201 and can, if necessary, completely balance this inertial force. When so balanced, the phase angle of piston 201 is such that mid-stroke position of piston 201 occurs at both the maximum and the minimum of the engine working fluid pressure as shown by the solid line in FIG. 3C, and is independent of stroke of piston 201. Alternately, piston 201 may be driven solely by the differential area without using gas springs, by increasing the dead volume of chamber 225 by using an auxiliary chamber for additional dead volume. The driving force so obtained can be further increased by connecting chamber 225 to center chamber 218' which results in approximately doubling the pressure difference applied to the differential area of piston 201.

Similarly, the inertial force of pistons 203 and 203' can be opposed by removing splines 215 on piston 203 and employing chambers 218 as gas spring chambers. By varying the dead volumes of chambers 218, the gas spring rate may be varied to provide the degree of inertial force balancing necessary to achieve the desired phase angle between pistons 201 and 203'. If both pistons 201 and 203' (with piston 203) are fully inertial balanced by gas springs, then the phase angle is 180° and negligible work output is produced. Since phase angle influences work output and since phase angle is a function of the damping level produced by alternator load, if pistons 203 and 203' are not fully inertial balanced by gas springs, then the phase angle as well as stroke of pistons 201 and 203' will self-vary and thereby self-regulate to match the work output of piston 203' to the alternator load.

These dynamic relations determine the damped resonant frequency of piston reciprocation, with the frequency primarily determined by the mass of the reciprocating components and the effective spring constant of the working fluid, whereas the stability of oscillations requires the balancing of working fluid masses and the limiting of the strokes of pistons 201 and 203'. Fluid mass balancing is achieved by having the mass of the working fluid in outer chambers 218' and 224 and center chamber 224 together with that contained in the heat exchangers equal the mass of working fluid (termed ballast fluid) contained in center chamber volume 217', which volume may include an auxiliary chamber to minimize the size of center chamber provided by cylinder sleeve 207''. This mass balancing feature is necessary for stable periodic reciprocation and is employed in all embodiments of this invention in which a ballast fluid is used.

Stroke limiting is provided by the use of bounce chambers 240 at stroke ends as shown in FIG. 3 with specific details for two designs shown in FIGS. 3D and 3F. FIG. 3D shows bounce chambers, provided in the ends of piston 201, which limit the left stroke of left piston by straight sided male plunger insert 201a mating with tapered female bore 206'a which captures fluid in left chamber 224a terminated by cylinder head 206 and thereby arrests the left stroke of left piston 201 by compressing fluid so captured, with damping provided by the variable area orifice formed between straight plunger insert 201a and tapered bore 206'a. The right stroke of left piston 201 is limited by the tapered female bore 201b located in the right end of left piston 201 mating with straight sided plunger insert 201a located in the left end of right piston 201 which captures fluid in center chamber 224b and thereby arrests the right stroke of left piston 201 and the left stroke of right piston 201, independent of axial position in sleeve 206' where mating occurs. Concentricity of mating is provided by gas film supported lands 234 that closely fit sleeve 206'. FIG. 3F shows bounce chambers provided in annular space 225 that limit the left stroke of left piston by the straight sided male land 201a mating with tapered female bore 206' a which captures fluid in left chamber 225a and thereby arrests the left stroke of left piston 201 by the above described compression and damping effect. The right stroke of left piston 201 is limited by the straight sided male land 201b mating with tapered female bore 206'b which captures fluid in right chamber 225b and thereby arrests the right stroke of left piston 201 by the above described effects. By so limiting the stroke of piston 201, the midstroke position of piston 201 remains axially centered in sleeve 206'.

The embodiment of this invention shown in FIG. 3 may be altered by using piston 203' as the magnetic piston 203 and providing alternator coils 209 in cyliner 207' thereby eliminating cylinder 207, bushing 204 and drive rod 202 without changing the thermodynamic cycle or operation of the embodiments shown in FIG. 3.

The embodiment of this invention shown in FIG. 3 can be operated as a heat pump by applying an AC voltage to alternator coils 209 which causes linear motor action that in turn drives piston 203' causing periodic fluid expansion in center chamber 224 and periodic fluid compression in outer chambers 224 and 218'. The periodic fluid expansion in center chamber 224 causes heat to be absorbed from heaters 221 thereby cooling the heaters whereas the periodic fluid compression in left chambers 218' and 224 causes heat to be rejected from the coolers 213 thereby heating the coolers. If external heat rejection is provided at coolers 213, then an external cooling effect is produced at heaters 221 as the pistons continue to reciprocate by being driven by electric power supplied to coils 209. As a result, heat is pumped from the lower temperature heaters 221 to the higher temperature coolers 213 and therefore this embodiment functions as an electrically driven heat pump.

An alternate load for the alternator load embodiment shown in FIG. 3 is a fluid pump which replaces the linear alternator contained in cylinder 207. One such fluid pump is shown in FIG. 3G as a double acting piston pump that is driven by drive rod 202, connected to piston 231, which reciprocally pumps fluid through inlet check valves 232 and outlet check valves 233 with sealing from chamber 218' provided by sealed bushing 204 and where the pumped fluid is either gaseous or liquid.

Another embodiment of the present invention is shown in FIG. 4, and such embodiment includes piston 303 which is driven by the cyclic variation in fluid pressure and is separated from either piston 301 or 303' whereas the other components are similar to those shown in FIG. 3.

The operation of this embodiment will be described by considering one cycle of operation, first for discrete reciprocation of pistons 301, 303, and 303' and then for the continuous nearly sinusoidal reciprocation which occurs in practice. Again considering only the half of the machine to the left of the vertical line of symmetry (since the right half operates in mirror-image fashion to the left half) and beginning the cycle when piston 301 is at right stroke limit, piston 303' is at right stroke limit and piston 303 is at left stroke limit then piston 303' full strokes leftward adiabatically compressing the cool working fluid in left chambers 318' and 324 and adiabatically expanding the fluid in center chamber 318'. Piston 301 then full strokes leftward transferring fluid from left chamber 324 through cooler 313, regenerator 320 and heater 321 to center chamber 324 thereby heating the fluid transferred. Simultaneously, piston 303 moves rightward increasing the volume of left chamber 318 and adiabatically compressing the fluid in center chamber 318. The volume increase in left chamber 318 is such as to maintain constant pressure in left chambers 318 and 324 and center chamber 324 as piston 301 strokes leftward. As a result, the heat addition to fluid transferred through the heat exchangers to center chamber 324 is a constant pressure heat addition process. Pistons 301 and 303' are at left stroke limit and piston 303 is at right stroke limit. Piston 303' then full strokes rightward adiabatically expanding the fluid in left chambers 318' and 318 and center chamber 324 while adiabatically compressing the fluid in center chamber 318'. Piston 301 then full strokes rightward transferring fluid from center chamber 324 through heater 321, regenerator 320 and cooler 313 to left chamber 324 thereby cooling the transferred fluid. Simultaneously, piston 303 strokes leftward decreasing the fluid volume in left chamber 318 while adiabatically expanding fluid in center chamber 318. The decrease in fluid volume in left chamber 318 is such as to maintain constant pressure in left chambers 318, 318', and 324 and center chamber 324 as piston 301 stokes rightward. As a result, the heat rejection from fluid transferred through the heat exchangers to left chamber 324 is a constant pressure cooling process. This completes the cycle during which the fluid in left chambers 318, 318', and 324 and center chamber 324 has been discretely subjected to an adiabatic compression, a constant pressure heat addition, an adiabatic expansion and a constant pressure cooling which corresponds to the classic Brayton cycle, shown on pressure-volume coordinates in FIG. 4A. The area enclosed by the curve traced in FIG. 4A represents the net work produced by the fluid in this cycle.

Considering next the operation of this embodiment for continuous nearly sinusoidal stroking of pistons 301, 303, and 303', the cyclic pressures are no longer distinct but become diffuse with the adiabatic compression and expansion processes becoming polytropic processes and the heat addition and rejection processes occuring nearly at constant pressure, as is displayed on pressure-volume coordinates shown in FIG. 4B for this cycle. The area enclosed by the curve traced in FIG. 4B represents the net work produced by the fluid in this cycle. This net work is delivered to piston 303 wherein it overcomes the induced electromagnetic drag experienced by piston 303. The driving force on pistons 303 and 303' are equal respectively to the product of the pressure difference between left and center chambers 318 and 318' times the cross-sectional area of piston 303 and 303'. The pressure in left chambers 318, 318', and 324 and in center chamber 324 varies nearly sinusoidally with time but is nearly constant (subject to a small variation between left and center chambers 324 due to heat exchanger pressure drop) in each chamber at any given time, as shown by the solid curve in FIG. 4C. The pressure in center chamber 318', which contains the same (ballast) fluid mass as that contained in outer chambers 318, 318', and 324 and center chamber 324 together with that contained in the left and right heat exchanger sets, varies nearly identically but is 180° out of phase with the pressure in outer chambers, as shown by the dashed curve in FIG. 3C. The difference between these two pressures, which is nearly sinusoidal, is the pressure difference that acts on piston 303'. The pressure in center chamber 318 varies nearly sinusoidally but is out of phase with the pressure in outer chambers, as shown by the dotted curve in FIG. 3C. The difference between the pressure in the outer chambers represented by the solid curve and the dotted curve, which is dependent on the phase angle between pistons 301, 303, and 303' and which is nearly sinusoidal, is the pressure difference that acts on piston 303.

The driving force on pistons 301 is by the same means as that for piston 201 in FIG. 3 and the opposing forces are the damping and inertial forces which are caused by the same phenomena as that for piston 201 in FIG. 3. The relationship of these forces determines the phase angle of piston 201 to pistons 203' which angle is dependent on alternator load and piston designs. This force relationship can be simply described by considering piston 301 to have its inertial forces fully balanced by gas spring force which then locks its phase to fluid pressure in left and right chambers 324, with mid-stroke position occurring at maximum and minimum pressures in said chambers. Piston 303' is at outer stroke limit position for maximum pressure in outer chambers and at inner stroke limit for minimum pressure in outer chambers. As a result, piston 303' leads piston 301 by 90° independent of both stroke of pistons 301 or 303' and alternator load. The maximum rightward driving force on piston 303 occurs at maximum outer chamber pressure and the maximum leftward driving force occurs at minimum outer chamber pressure. Since this driving force is balanced by the alternator drag (damping) and inertial forces, then the phase angle of piston 303 is dependent on alternator damping force (electrical load). At no load piston 303 exhibits only an inertial force component which is maximum at piston 303 stroke ends and is balanced by a low fluid pressure ratio produced by a small stroke of pistons 301 and 303' with piston 303 in phase with piston 303'. As the alternator load increases, the linear electromagnetic damping force increases at constant stroke of piston 303 which shifts phase of piston 303 to lead piston 303' and the increase in damping force is balanced by a higher fluid pressure ratio produced by a larger stroke of pistons 301 and 303'. At maximum alternator load the alternator damping force is a maximum at constant stroke of piston 303 which causes piston 303 to lead 303' by nearly 90° (dependent on piston 303 inertial force) and this maximum damping force is balanced by a maximum fluid pressure ratio produced by the stroke limit of pistons 301 and 303' which still maintain a 90° phase angle. As a result, this embodiment self-regulates to load by increasing stroke of pistons 301 and 303', which increases the cyclic pressure ratio of the working fluid, and shifting phase 303 relative to pistons 301 and 303' as the alternator load increases while maintaining constant stroke of piston 303 which is desirable in a fixed voltage output linear alternator.

The damped resonant frequency of piston reciprocation is primarily determined by the mass of the reciprocating components and the effective spring constant of the working fluid, which frequency is independent of electrical load. Overstroking is prevented by employing piston bounce chambers, such as shown in FIG. 4, which function similarly as that in the embodiment shown in FIG. 3.

The embodiment of this invention shown in FIG. 4 can be operated as a heat pump by applying an AC voltage to alternator coils 309 which causes linear motor action that pumps heat from the lower temperature heaters 321 to the higher temperature coolers 313 by subjecting the working fluid to a thermodynamic cycle comprising a polytropic compression process, a nearly constant pressure heat addition process, a polytropic expansion process and a nearly constant pressure heat rejection process and therefore this embodiment functions as an electrically driven heat pump in which the working fluid pressure ratio varies with heat load as well as does the stroke of pistons 301 and 303' which increases the capacity of the heat pump as the temperature difference between heater and cooler increases.

An alternate load for the alternator load embodiment shown in FIG. 4 is a fluid pump, shown in FIG. 4D, in which piston 303 is sealed by roll sock seal 336 and center chamber 318 is the pumping chamber in which piston 303 reciprocally pumps fluid through inlet check valve 332 and outlet check valve 333, where the pumping fluid is either gaseous or liquid. Alternately a bellows 342 can be placed within inner chamber 318 and attached to each of the inner faces of pistons 303 while rigidly affixing the mid-section of the bellows to the housings of check valves 332 and 333 wherein the bellows mid-section is drilled to provide fluid communication between the bellows interior and said check valves. Such a modification permits pumping a fluid at a pressure different from that of the working fluid contained in outer chambers 318 since the bellows cross-sectional area differs from that of pistons 303. Alternately, cylinder 307 can be eliminated and the pumping pistons 303 mounted in the ends of cylinder 306 whereby pistons 303 are driven by the working fluid in outer chambers 324. By so locating the fluid pump permits adding the alternator as shown in FIG. 4 so as to cause the machine to produce both fluid energy and electrical energy without changing the thermodynamic cycle which comprises a polytropic compression process, a nearly constant pressure heat addition process, a polytropic expansion process and a nearly constant pressure heat rejection process in which the working fluid pressure ratio varies with load. The polytropic processes can be made nearly isothermal by employing in all variable volume chambers a deformable gauze type matrix which absorbs heat during fluid compression and rejects heat during fluid expansion. In addition, external ballast fluid chambers 318 and 318' can be filled with a regenerator matrix, such as metal wool 341 to cause the compression and expansion of the ballast fluid contained therein to be isothermal processes.

For the embodiments of this invention (such as shown in FIG. 4) in which the working fluid pressure ratio varies with load and in which the working fluid is subjected to a thermodynamic cycle comprising a polytropic compression process, a nearly constant pressure (isobaric) heat addition process, a polytropic expansion process and a nearly isobaric heat rejection process with thermal regeneration between heat addition and rejection temperatures, a novel thermodynamic cycle is obtained which may be more fully appreciated by considering the following discussion.

A thermodynamic cycle comprising two isobaric processes joined by isothermal (constant temperature) compression and expansion processes and in which thermal regeneration is complete defines the classic Ericsson cycle which has Carnot efficiency, provided all other cycle irreversibilities are eliminated. In a cycle having isobaric processes joined by polytropic compression and expansion processes such polytropic process can approach isothermal processes if the working fluid is respectively cooled and heated. Apparatus capable of subjecting a fluid to such a thermodynamic cycle are illustrated in the embodiments of FIGS. 4, 6, and 7. How closely these isothermal processes can be approached depends on the temperature difference between working fluid and exchanger that is necessary for heat exchange at finite rates in finite sized heat exchangers. If in a given cycle this temperature difference is a minimum for a given output and if regeneration is as complete as possible for a given regenerator, then this cycle is as close to the Ericsson cycle as is practical and the thermodynamic efficiency is as close to Carnot as practical. Noting that the temperature difference necessary for heat transfer in a given heat exchanger increases with thermal load (heat transfer rate), implying constant thermal resistance,* then this increase in temperature difference with load must occur in the working fluid and be produced by increasing the pressure ratio in the polytropic compression and expansion processes that join the isobaric processes of the cycle, as shown in FIG. 5, wherein the solid curve represents a low work output cycle and the dashed curve a high work output cycle. In the low work cycle, the temperature difference $\Delta T_c$ required for heat rejection is produced by the polytropic compression process and the temperature difference $\Delta T_h$ required for heat addition is produced by the polytropic expansion process, where these two polytropic processes join the two isobaric processes which thereby define this cycle's pressure ratio, provided by the polytropic processes. At this low output condition the temperature differences $\Delta T_c$ and $\Delta T_h$ are sufficient to provide the necessary heat transfer to produce the work output of the cycle which is represented by the area enclosed by the solid curve. In the limit of the polytropic compression and isobaric cooling processes become an isothermal cooling process and the polytropic expansion and isobaric heating processes become an isothermal heating process. In the high work cycle, the temperature differences $\Delta T_c'$ and $\Delta T_h'$ required for the respective heat rejection and heat addition are produced by the respective polytropic compression and expansion processes that join the two isobaric processes which thereby define this cycle's pressure ratio, provided by the polytropic processes. At this high output condition the temperature differences $\Delta T_c'$ and $\Delta T_h'$ are sufficient to provide the necessary heat transfer to produce the work output of the cycle. As a result, in this cycle the working fluid pressure ratio increases with load to provide the necessary heat transfer and the necessary work output throughout the operating load range while maintaining the efficiency as close to Carnot as possible and therefore defines a novel thermodynamic cycle, termed load modified Ericsson cycle. Such a cycle is produced in the embodiment shown in FIG. 4 by automatically varying the stroke of pistons 301 and 303' to match load conditions while optimizing the thermal efficiency to be as close to Carnot as possible.

* For a given periodic flow, compact heat exchanger operating at essentially a constant pressure during a cyclic process and at a temperature that does not vary substantially throughout its fluid flow length (to markedly change fluid properties) then the heat exchange rate ($Q$) between exchanger and fluid can be represented using Colburn's theory as
$$\dot{Q} = C_u{}^{1-n} \Delta T$$
where $C$ and $n$ are constants for the exchanger and fluid, $u$ is the fluid velocity in the exchanger and $\Delta T$ is the temperature difference between fluid and exchanger. For heat exchangers used in this invention, the value of $n$ is close to unity which implies that the heat exchange rate is essentially proportional to the temperature difference between fluid and exchanger and therefore the exchanger exhibits constant thermal resistance.

Another embodiment of this invention is shown in FIGS. 6A-D in which FIG. 6A illustrates operating principle of this embodiment by showing the four discrete processes of the cycle and FIG. 6B the configuration of the embodiment that accomplishes this operating principle. Referring to FIG. 6A, the top illustration shows the piston positions at the start of the cycle whereas the next lower illustration shows the piston positions at the end of process 1-2. Process 1-2 is produced by piston 403' moving rightward compressing and transferring fluid from right chamber 418' through tube 419, regenerator 419' (where fluid is cooled) to left chamber 424, with such compression process being polytropic. Process 2-3 (from positions 2 to 3 in FIG. 6A) is obtained by piston 401 stroking leftward which transfers fluid from left chamber 424 through cooler 413, regenerator 420 and heater 421 to center chamber 424 (formed to the left of the illustrated dashed line) thereby heating the fluid. Simultaneously, piston 403 strokes rightward increasing the volume of chamber 418 (formed to the right of the illustrated dashed line) so as to maintain constant working fluid pressure in chamber 418 and left and right chambers 424, as well as in the heat exchangers during the heating process produced by the left stroking of piston 401. As a result, process 2-3 is a constant pressure heat addition process. Process 3-4 is obtained by piston 403' stroking leftward which expands the fluid in right chamber 424, and chambers 418 and 418' as the fluid is transferred through tube 419 and regenerator 419' (which heats the fluid) to chamber 418' with such expansion process being polytropic. Process 4-1 (from positions 4 to 1 in FIG. 6A) is obtained by piston 401 stroking rightward which transfers fluid from center chamber 424 through heater 421, regenerator 420 and cooler 413 to left chamber 424 thereby cooling the fluid. Simultaneously, piston 403 strokes leftward decreasing the volume of chamber 418 so as to maintain constant pressure in the working fluid during the cooling process produced by the right stroking of piston 401. This completes the cycle which comprises a polytropic compression, constant pressure heat addition, polytropic expansion and constant pressure heat rejection processes. A particular feature illustrated by this cyclic sequence is that piston 403 lags piston 403' by the time period occurring between each cyclic step, which for sinusoidal oscillation and equal cyclic step periods would correspond to piston 403 lagging piston 403' by 90°. In addition, it may be noted that the fluid contained in the chamber to the right of piston 403 functions as the fluid in chamber 418' but cyclically lags such fluid by one cyclestep, whereas placing another piston 401 to the left of piston 403' and adding heat exchangers 413, 420, and 421 to cylinder 307' cause cylinders 406 and 407' to have equal construction. The result of these features permits four of these cylinders to be joined as shown in FIG. 6B with each cylinder operating 90° out of phase with adjacent cylinders. For compactness, the four cylinders would be square clustered and axially colinear.

The method of driving pistons 401, 403, and 403' is the same as that used for driving the respective pistons 301, 303, and 303' in FIG. 4. The variable phasing and variable stroking features that permit load matching while optimizing efficiency are the same as those used in the embodiment shown in FIG. 4, as is the thermodynamic cycle.

Further, the embodiment shown in FIG. 6B permits reverse operation by supplying AC voltage to alternator coils 409 for pumping heat from the lower temperature heater 421 to the higher temperature cooler 413.

The embodiment shown in FIG. 6B can be modified as shown in FIG. 6C wherein left extension of cylinder 406 is added to accommodate piston 431 with attached roll sock seal 436 that seals left chamber 424 from fluid that is reciprocally pumped through inlet check valve 432 and outlet check valve 433, where the pumped fluid is either gaseous or liquid.

The embodiment of this invention shown in FIG. 6B produces 4 phase AC electrical output which embodiment can be modified as shown in FIG. 6D to an opposed piston design which generates 3 phase AC output by using three cylinders, with opposed left and right sides of such cylinders connected as in the embodiment shown in FIG. 6B which connection causes adjacent cylinders to function both mechanically and electrically in similar fashion to that of embodiment shown in FIG. 6B, but with a 120° phase difference.

The embodiment shown in FIG. 6D may be reversed by supplying 3 phase AC voltage to alternator coils 409 to pump heat from the lower temperature heaters 421 to the higher temperature coolers 413.

The embodiment shown in FIG. 6D may obviously be modified to produce pressurized fluid output using the fluid pump embodiment shown in FIG. 6C for the four cylinder embodiment, but herein mounted on the left and right ends of each of the three cylinders.

Another embodiment of this invention is shown in FIG. 7 in which a thermal engine embodiment of this invention drives a heat pump embodiment of this invention without intermediary mechanical coupling. In FIG. 7, the engine embodiment is shown to the left and comprises piston 501 contained in sleeve 506' that is end-connected to heat exchanger assembly comprising heater 521, regenerator 520 and cooler 513, with transfer tube 519 and regenerator 519' connecting cooler 513 to axial mid-point of sleeve 507'' containing piston 503', whereas the heat pump embodiment is shown to the right and comprises piston 503' contained in sleeve 507 that is end-connected to heat exchanger assembly comprising heater 521', regenerator 520', and cooler 513' with transfer tube 519 and regenerator 519' connecting cooler 513' to axial mid-point of sleeve 507'' so as to permit the heat pump to use regenerator 519' and piston 503' in common with the engine. Heater 521 adds heat to the working fluid at nearly the heater temperature which is higher than that of cooler 513, and cooler 513 removes heat from the working fluid at nearly the cooler temperature. Heater 521' adds heat to the working fluid at nearly the heater temperature which is lower than that of cooler 513' and cooler 513' removes heat from the working fluid at nearly the cooler temperature.

The operation of this embodiment can be appreciated following the machine through one cycle of operation, first for discrete reciprocation of pistons 501, 503, and 503' and then for continuous nearly sinusoidal reciprocation, which occurs in practice. Referring to the upper illustration of FIG. 7, process 1-2 (from position 1 to position 2 in FIG. 7) starts with piston 501 at left stroke limit, pistons 503' at inner stroke limit and piston 503 at right stroke limit. Piston 501 full strokes rightward transferring working fluid from right chamber 524 through cooler 513, regenerator 520 and heater 521 to left chamber 524 thereby heating the transferred fluid. Simultaneously, piston 503 full strokes leftward transferring the fluid in left chamber 518 through cooler 513', regenerator 520', and heater 521' to right chamber 518 thereby cooling the transferred fluid, since heater 521' is at a lower temperature than cooler 513'. By selecting the fluid volume of chamber 518 to be such that the fluid pressure remains constant during process 1–2 (which volume is obtained by using the continuity equation and the equation of state for the working fluid) then in process 1–2 heating occurs at constant pressure. In process 2–3, pistons 503' full stroke in outward opposition, polytropically expanding the fluid in center chamber 518', left chamber 524 and right chamber 518 while compressing the fluid in left and right chambers 518'. The fluid expansion in left chamber 524 and right chamber 518 cools the fluid below the respective heater temperatures in 521 and 521'. In process 3–4, piston 501 full strokes leftward transferring fluid from left chamber 524 through heater 521 where external heat is added at a high temperature, regenerator 520 and cooler 513 to right chamber 524 thereby cooling the transferred fluid. Simultaneously, piston 503 full strokes rightward transferring fluid in left chamber 518 through heater 521' where external heat is added at low temperature, regenerator 520' and cooler 513' to left chamber 518 thereby heating the transferred fluids. In this process, heat is added at constant pressure owing to the fluid volume ratio of right chamber 518 to left chamber 524, determined by the continuity equation and the equation of state of the working fluid so as to maintain constant pressure during this process. In process 4–1, pistons 503' full stroke inward in opposition polytropically compressing fluid in center chamber 518', in right chamber 524 and left chamber 518, while expanding the fluid in left and right chamber 518'. The fluid compression in right chamber 524 and left chamber 518 heats the fluid above the respective cooler temperatures in coolers 513 and 513' which coolers during process 1–2 remove heat from the working fluid. This completes the cycle comprising of a polytropic compression process, an isobaric heating process at high temperature in the engine and an isobaric cooling process at sub-ambient temperature in the heat pump, a polytropic expansion process, and an isobaric cooling process at above ambient temperature in the engine and an isobaric heating process at sub-ambient temperature in the heat pump with such cycle producing zero net work (the heat pump absorbs the entire engine output) and wherein the engine portion of this cycle operates on the load modified Ericsson cycle shown in FIG. 5 and the heat pump portion operates on a reversed load modified Ericsson cycle.

This embodiment when operated with continuous sinusoidal piston reciprocation produces a load modified Ericsson cycle in which the discrete processes are no longer distinct and in which the engine and heat pump portions of the cycle, when separately displayed on temperature-entropy coordinates, each exhibit a rounded more isothermal curve for the heat addition and rejection processes which are joined by less perfect isobaric processes than illustrated by the curve shown in FIG. 5.

Load matching and efficiency optimizing at each load is provided by variable pressure ratio operation, as used in the embodiment shown in FIG. 4 and described by FIG. 5, with variable pressure ratio herein provided by variable stroke pistons 503', which in turn vary the stroke of pistons 501 and 503 by varying the pressure ratio with load. As a result, as the heat pump load increases, the stroke of pistons 501 and 503 increases which cyclically subject a greater volume and therefore mass of working fluid to the cycle while operating at an increased pressure ratio and therefore produce a larger area enclosed in the p-V and temperature-entropy diagrams which indicate that the heat pump capacity increases with the temperature difference through which heat is pumped. This feature is desirable for producing both cooling and heating effect since for heating the heat pump capacity increases as the ambient temperature decreases whereas for cooling the capacity increases as the ambient temperature increases. This positive load capacity feature together with the features of self-regulation to load and self-optimization of thermal efficiency to a value as close to Carnot as is possible for each load result in unique and distinct heat pump features.

The driving force for pistons 501 and 503 is provided by the differential area of these pistons, with such force functioning in this embodiment similarly to that force on piston 301 in the embodiment shown in FIG. 4, whereas the driving force for pistons 503' is provided in this embodiment similarly to that force on piston 303' in the embodiment shown in FIG. 4.

This embodiment reciprocates at the damped resonance frequency of the pistons which is determined primarily by the effective spring constant of the working fluid and the mass of the reciprocating elements. This embodiment may be modified as shown in FIG. 7A by connecting an additional cylinder containing pistons therein to tube 519 to obtain work output, which work output for FIG. 7A is electrical power that is produced in alternator coils 509 of alternator cylinder 507 by the sinusoidal reciprocation of pistons 503", which alternator shunts power from the heat pump in response to electrical load to generate AC electrical power and thereby functions as a total energy system without appreciably modifying the thermodynamic cycle of the embodiment shown in FIG. 7. At zero electrical load the cycle is identical to that of the embodiment shown in FIG. 7, while at zero heat pump load the cycle is identical to that of the embodiment shown in FIG. 4. Alternately, cylinder 507'" may contain alternator coils 509 that generate electrical power by magnetic pistons 503' reciprocating therein.

The embodiment of FIG. 7 can be modified as shown in FIG. 7B to achieve cryogenic refrigeration temperatures by adding a second stage comprising a low-temperature, low thermal conductivity cylinder 507" to cylinder 507 and attaching a low thermal conductivity hollow piston 503" to piston 503 in which hollow space 520" is filled with a high thermal capacity regenerator matrix. Attached to the end of cylinder 503" is a high conductivity plate 521" which serves as the cryogenic chill plate. In operation, the working fluid contained in cryogenic chamber 518" is in cyclic phase with the fluid in chamber 518 and therefore is subject to the same thermodynamic cycle as that fluid in chamber 518, but thermally distant from chamber 518 and connected by regenerator 520". The addition of this second stage enables temperatures below 10°K to be produced at the chill plate 521''. If a remote refrigeration load, shown as 522a in FIG. 7B, is necessary, then heat is transferred (e.g., by ebullition cooling) from refrigeration load 522a to plate 521'' which in turn transfers the heat to working fluid in chamber 518''. The use of a matrix material in regenerator 520'' having a high heat capacity at cryogenic temperatures, as exhibited by lithium gauze, increases the refrigeration capacity of this refrigerator. Adding a third stage of similar design to that of stage two, but of smaller bore diameter, produces refrigeration down to 5°K at the third stage chill plate. In addition, the embodiment of FIG. 7B can be cascaded so as to produce cooling at both absorber 521' and chill plate 521'', but at different temperatures.

An additional feature of all embodiments of this invention which employ a differential area engine piston is that these embodiments are self-starting with the application of heat to the engine. This feature may be appreciated more fully by referring to FIG. 7 in which at startup all heat exchangers are at essential equal temperature. Applying heat to heater 521 increases fluid pressure throughout the machine owing to a constant volume heat addition process. The increase in fluid pressure drives piston 501 rightward and piston 503 leftward due to the use of differential area pistons 501 and 503. The rightward motion of piston 501 transfers fluid from right chamber 524 through heat exchangers 513, 520, and 521 (which heat the fluid) to left chamber 501. The leftward motion of piston 503 transfers fluid from left chamber 518 through heat exchangers 513', 520', and 521' to right chamber 518 without heat transfer since these exchangers are at essentially the same temperature. Therefore, heat added by exchanger 521 produces a constant volume heat addition process with a resulting substantial increase in fluid pressure. This pressure increase is communicated to center chamber 518' which results in an unbalanced outward axial force on pistons 503', owing to outer chambers 518' being at the initial startup pressure. This force overcomes the static friction of pistons 503' (since a gas lubricating film is not available at startup) and once broken loose, pistons 503' stroke outwardly expanding the fluid in center chamber 518' and compressing the fluid in outer chambers 518'. This expansion reduces fluid pressure in the machine which in turn reverses the force direction on and hence stroke of pistons 501 and 503. The leftward motion of piston 501 results in heat rejection as fluid is transferred from left to right chambers 524 while no heat exchange results in transferring fluid from right to left chambers 518. Heat therefore is rejected at constant volume which results in a substantial decrease in fluid pressure. This low fluid pressure is communicated to center chamber 518' which reverses the direction of force on and stroke of pistons 503' owing to the high fluid pressure in outer chambers 518' caused by the previous compression of fluid in these chambers. The inward motion of pistons 503' compress the fluid in inner chamber 518' and expand the fluid in outer chamber 518'. This compression increases the fluid pressure in the machine which reverses the direction of force on and stroke of pistons 501 and 503. This cyclic process continues until the machine pumps itself up to a stable stroke and piston phase condition that matches the heating/cooling load impressed on the heat pump heat exchangers.

Shut down is accomplished by shutting off the heat source applied to engine heat exchanger 521. The stroke of the pistons then decays, analogous to the response of a forced oscillator subjected to removal of the forcing potential which in this invention is the heater with thermal capacity (thermal inertia).

Thus it will be seen that the present invention provides an extremely useful, desirable and efficient thermal machine in which the positive displacement elements freely oscillate at a damped resonant frequency and vary their stroke and relative phase angle to match applied load, to optimize efficiency at a given load and to self-start. These features permit the use of a novel thermodynamic cycle which is as close to Carnot efficiency as is possible for a given machine as well as provide the mechanism for optimizing the efficiency of this cycle at any given load. Further, the use of freely oscillating positive displacement elements provides the means for using working fluid self-acting gas bearings for support and sealing which permit the hermetic sealing of the working fluid in a compact, vibration-free machine. These features combine to form the basis for a machine that is quiet, simple and reliable and that can be configured in a number of embodiments to provide pressurized fluid, electrical, pumped heat output or combinations thereof having a versatility of applications. The invention can be incorporated into reciprocating, rotating, or other forms of mechanical positive displacement oscillators without sacrificing the advantages alluded to hereinabove.

Although several embodiments of the invention have been shown and described, it will be obvious that other adaptations, modifications and configurations can be made without departing from the true spirit and scope of the invention with such adaptations and modifications including cascaded cryogenic cooling and liquifaction refrigerator, valved resonant oscillators that operate on the load modified Ericsson cycle, and combinations of additional loads to the principal embodiments of the invention herein described.

I claim:
1. A thermodynamic cycle which subjects a working fluid to processing steps comprising:
   regeneratively cooling the working fluid approximately isobarically;
   compressing the working fluid to a prescribed pressure ratio, said compressing step including in combination polytropically compressing and approximately isobarically cooling the working fluid so as to approach an isothermal compressing step;
   regeneratively heating the working fluid approximately isobarically;
   expanding the working fluid to a prescribed pressure ratio, said expanding step including in combination polytropically expanding and approximately isobarically heating the working fluid so as to approach an isothermal expanding step; and said prescribed pressure ratios for said compressing and expanding steps being continuously varied to produce a net energy exchange per cycle that matches the instant cycle load, said net energy exchange determined by heat exchange rates in said compressing and expanding steps.

2. A cycle as recited in claim 1 wherein said regeneratively cooling, compressing, regeneratively heating and expanding steps are distinct and separable.

3. A cycle as recited in claim 1 wherein said cycle load is work output produced by said cycle.

4. A cycle as recited in claim 1 wherein said cycle load is heat pump effect produced by said cycle.

5. A cycle as recited in claim 1 wherein said cycle load is work output and heat pump effect produced by said cycle.

6. A cycle as recited in claim 1 obtained by interposing at least one positive displacement element in the working fluid, and oscillating the positive displacement element with the compressing and expanding working fluid to generate work output wherein the displacement of said element is continuously varied to match work output load.

7. A cycle as recited in claim 1 obtained by interposing at least one positive displacement element in the working fluid and applying work input to oscillate the positive displacement element and thereby generate heat pump effect wherein the displacement of said element is continuously varied to match heat pump load.

8. A cycle as recited in claim 1 obtained by interposing at least two positive displacement elements in the working fluid and oscillating the positive displacement elements with the compressing and expanding working fluid to generate work output and heat pump effect wherein the displacement of said elements is continuously varied to match work output and heat pump loads.

9. A cycle as recited in claim 1 obtained by interposing at least two positive displacement elements in the working fluid and in combination oscillating the positive displacement elements with the compressing and expanding working fluid and applying work input to augment oscillation of positive displacement elements and thereby generate heat pump effect wherein the displacement of said elements is continuously varied to match heat pump load.

10. A method of subjecting a working fluid to a thermodynamic cycle to obtain work output or to pump heat, said method comprising the steps of:
regeneratively cooling the working fluid;
polytropically compressing the working fluid with a resonant oscillating positive displacement element interposed in the working fluid, said compressing step including in combination isobarically cooling and polytropically compressing the working fluid while imposing a temperature difference on the fluid so that said polytropically compressing is nearly isothermal;
regeneratively heating the working fluid approximately isobarically; and
polytropically expanding the working fluid with a resonant oscillating positive displacement element interposed in the working fluid, said expanding step including in combination isobarically heating and polytropically expanding the working fluid while imposing a temperature difference on the fluid so that said polytropically expanding is nearly isothermal.

11. A method as recited in claim 10 wherein said regeneratively cooling, polytropically compressing, regeneratively heating, and polytropically expanding steps are distant and separable.

12. A method as recited in claim 10 and additionally comprising the step of deriving work output from the oscillating positive displacement element.

13. A method as recited in claim 10 and additionally comprising the step of applying work input to the oscillating positive displacement element.

* * * * *